(12) United States Patent
Dong et al.

(10) Patent No.: US 11,460,971 B2
(45) Date of Patent: Oct. 4, 2022

(54) CONTROL METHOD AND ELECTRONIC DEVICE

(71) Applicant: Huawei Technologies Co., Ltd., Shenzhen (CN)

(72) Inventors: Feng Dong, Shanghai (CN); Yong He, Shenzhen (CN); Jie Liu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/041,186

(22) PCT Filed: Mar. 26, 2018

(86) PCT No.: PCT/CN2018/080563
§ 371 (c)(1),
(2) Date: Sep. 24, 2020

(87) PCT Pub. No.: WO2019/183779
PCT Pub. Date: Oct. 3, 2019

(65) Prior Publication Data
US 2021/0096728 A1  Apr. 1, 2021

(51) Int. Cl.
| | |
|---|---|
| *G06F 3/0481* | (2022.01) |
| *G06F 3/0484* | (2022.01) |
| *G06F 3/0488* | (2022.01) |
| *G06F 3/16* | (2006.01) |
| *G06F 3/04817* | (2022.01) |
| *G06F 3/04842* | (2022.01) |
| *G06F 3/04883* | (2022.01) |
| *H04M 1/72427* | (2021.01) |

(52) U.S. Cl.
CPC ...... *G06F 3/04817* (2013.01); *G06F 3/04842* (2013.01); *G06F 3/04883* (2013.01); *G06F 3/167* (2013.01); *H04M 1/72427* (2021.01)

(58) Field of Classification Search
CPC ............. G06F 3/04817; G06F 3/04842; G06F 3/04883; G06F 3/167
See application file for complete search history.

(56) References Cited

U.S. PATENT DOCUMENTS

| | | | |
|---|---|---|---|
| 9,298,265 B2 * | 3/2016 | Jung | G06F 3/017 |
| 9,448,691 B2 * | 9/2016 | Suda | G06F 3/0482 |
| 9,535,600 B2 * | 1/2017 | Lee | G06F 3/04883 |

(Continued)

FOREIGN PATENT DOCUMENTS

| | | |
|---|---|---|
| CN | 102413229 A | 4/2012 |
| CN | 102566930 A | 7/2012 |

(Continued)

*Primary Examiner* — Daeho D Song
(74) *Attorney, Agent, or Firm* — Conley Rose, P.C.

(57) ABSTRACT

A method applied to a terminal device includes displaying a first home screen, detecting a preset first input, opening, in response to the first input, a first application, displaying a screen of the first application, where the first input is an input of a user for opening the first application, detecting a preset second input, displaying a second home screen in response to the second input, where the second home screen is a home screen on which an icon of the first application is located, where the preset second input is an input of the user for exiting the screen of the first application, and the first home screen is different from the second home screen.

20 Claims, 24 Drawing Sheets

(56) References Cited

U.S. PATENT DOCUMENTS

| | | | | |
|---|---|---|---|---|
| 9,910,524 B1* | 3/2018 | Wells | | G06F 3/0485 |
| 9,953,101 B1* | 4/2018 | Walliser | | G06F 21/32 |
| 2009/0307626 A1* | 12/2009 | Jalon | | G06F 3/0481 |
| | | | | 715/771 |
| 2010/0231533 A1* | 9/2010 | Chaudhri | | G06F 3/0485 |
| | | | | 345/173 |
| 2010/0313164 A1* | 12/2010 | Louch | | G06F 3/04845 |
| | | | | 715/790 |
| 2011/0138325 A1* | 6/2011 | Yang | | G06F 3/04883 |
| | | | | 715/800 |
| 2011/0252375 A1* | 10/2011 | Chaudhri | | G06F 3/0486 |
| | | | | 715/835 |
| 2012/0071208 A1* | 3/2012 | Lee | | G06F 3/04842 |
| | | | | 455/566 |
| 2012/0094719 A1* | 4/2012 | Choi | | H04M 1/72451 |
| | | | | 455/566 |
| 2012/0179969 A1* | 7/2012 | Lee | | G06F 3/04817 |
| | | | | 715/765 |
| 2012/0276953 A1* | 11/2012 | Kim | | G06F 9/44505 |
| | | | | 455/556.1 |
| 2012/0309463 A1* | 12/2012 | Lee | | G06F 3/04883 |
| | | | | 455/566 |
| 2013/0086523 A1* | 4/2013 | Imamura | | G06F 3/04817 |
| | | | | 715/810 |
| 2013/0218870 A1* | 8/2013 | Bukurak | | G06F 16/951 |
| | | | | 707/722 |
| 2013/0218923 A1* | 8/2013 | Kaul | | H04M 1/72403 |
| | | | | 707/769 |
| 2013/0268877 A1* | 10/2013 | Han | | G06F 3/04845 |
| | | | | 715/764 |
| 2013/0332886 A1* | 12/2013 | Cranfill | | G06F 3/0482 |
| | | | | 715/835 |
| 2014/0095967 A1* | 4/2014 | Cheng | | G06F 40/143 |
| | | | | 715/205 |
| 2014/0173517 A1 | 6/2014 | Chaudhri | | |
| 2014/0232671 A1 | 8/2014 | Chaudhri | | |
| 2014/0267103 A1* | 9/2014 | Chaudhri | | G06F 3/04817 |
| | | | | 345/173 |
| 2014/0282110 A1* | 9/2014 | Chaudhri | | G06F 3/04817 |
| | | | | 715/767 |
| 2014/0282208 A1 | 9/2014 | Chaudhri | | |
| 2014/0351748 A1 | 11/2014 | Xia et al. | | |
| 2015/0135109 A1* | 5/2015 | Zambetti | | G06F 3/03547 |
| | | | | 715/767 |
| 2015/0207920 A1* | 7/2015 | Choi | | H04M 1/72403 |
| | | | | 455/566 |
| 2015/0309689 A1* | 10/2015 | Jin | | G06F 3/0486 |
| | | | | 715/765 |
| 2016/0066140 A1* | 3/2016 | Gnanasekaran | ... | G06Q 20/3227 |
| | | | | 455/456.3 |
| 2016/0077720 A1 | 3/2016 | Park | | |
| 2016/0110094 A1* | 4/2016 | Kim | | G06F 3/14 |
| | | | | 715/846 |
| 2016/0266788 A1 | 9/2016 | Park et al. | | |
| 2016/0291836 A1* | 10/2016 | Gao | | G06F 3/0482 |
| 2016/0357577 A1* | 12/2016 | Gao | | G06F 3/0481 |
| 2017/0017355 A1* | 1/2017 | Lim | | G06F 3/0484 |
| 2017/0017391 A1* | 1/2017 | Hong | | G06F 1/1677 |
| 2017/0046441 A1* | 2/2017 | Lee | | G06F 3/04817 |
| 2017/0053314 A1* | 2/2017 | Glover | | G06Q 30/0267 |
| 2017/0060382 A1* | 3/2017 | Lee | | G06F 3/04842 |
| 2017/0109011 A1* | 4/2017 | Jiang | | G06F 3/04883 |
| 2017/0154609 A1* | 6/2017 | Yoon | | G06F 3/0488 |
| 2017/0228131 A1* | 8/2017 | Pandiaraj | | G06F 3/04817 |
| 2018/0011630 A1* | 1/2018 | Kim | | G06F 3/0482 |
| 2018/0067596 A1* | 3/2018 | Wells | | G06F 1/1671 |
| 2018/0136819 A1* | 5/2018 | Lee | | G06F 3/0481 |
| 2019/0179500 A1* | 6/2019 | Kim | | G06F 3/048 |
| 2020/0241732 A1* | 7/2020 | Lu | | H04M 1/72469 |
| 2022/0021714 A1* | 1/2022 | Hwang | | H04L 63/083 |

FOREIGN PATENT DOCUMENTS

| | | |
|---|---|---|
| CN | 102857629 A | 1/2013 |
| CN | 103902363 A | 7/2014 |
| CN | 104238927 A | 12/2014 |
| CN | 104598104 A | 5/2015 |
| CN | 104881207 A | 9/2015 |
| CN | 105843468 A | 8/2016 |
| CN | 106095248 A | 11/2016 |
| CN | 106354372 A | 1/2017 |
| CN | 106406924 A | 2/2017 |
| CN | 106708362 A | 5/2017 |
| CN | 106873852 A | 6/2017 |
| CN | 107038032 A | 8/2017 |
| CN | 107678618 A | 2/2018 |
| KR | 20150099430 A | 8/2015 |
| WO | 2015058599 A1 | 4/2015 |
| WO | 2017032089 A1 | 3/2017 |
| WO | 2017075515 A1 | 5/2017 |

* cited by examiner

CONTROL METHOD AND ELECTRONIC DEVICE

CROSS-REFERENCE TO RELATED APPLICATIONS

This application is a U.S. National Stage of International Patent Application No. PCT/CN2018/080563 filed on Mar. 26, 2018, which is hereby incorporated by reference in its entirety.

TECHNICAL FIELD

This application relates to the field of terminal technologies, and in particular, to a control method and an electronic device.

BACKGROUND

With rapid development of a chip technology and an internet technology, a user may install various applications (APP), for example, WeChat, Alipay, and Dianping, on a terminal device such as a mobile phone or a tablet computer based on a requirement of the user.

After the terminal device is powered on, a screen that can be displayed in a screen-on state is a home screen. The home screen may be a HiBoard or a screen for displaying an application icon. For example, home screens of the terminal device include the HiBoard, a first home screen, and a second home screen. The HiBoard is a screen A shown in FIG. 1a. The first home screen is a screen B shown in FIG. 1b. The second home screen is a screen C shown in FIG. 1c. It can be learned from FIG. 1b that a QQ icon is on the first home screen. It can be learned from FIG. 1c that a WeChat icon is on the second home screen. If the user needs to use QQ, the user may open QQ by tapping the QQ icon when the screen B is displayed on the terminal device. If the user needs to use WeChat, the user may open WeChat by tapping the WeChat icon when the screen C is displayed on the terminal device.

However, when there are a relatively large quantity of home screens used to display application icons or there are a relatively large quantity of application icons on a home screen, the user may forget a specific location of an icon of an application that needs to be used. Generally, the user may enter "a name of the application that needs to be opened" in a search box of the HiBoard, to trigger the terminal device to display the icon of the application that needs to be opened. Then, the user opens the application by tapping the icon, displayed on the terminal device, of the application that needs to be opened. However, in this case, after exiting a screen of the application, the user cannot learn the specific location of the application icon.

For example, if the user forgets a location of the QQ icon, the user may trigger, by swiping rightwards when the terminal device displays the screen B shown in FIG. 1b, the terminal device to display the screen A shown in FIG. 1a. The user may enter "QQ" in a search box 101 on the screen A, to trigger the terminal device to display a screen D shown in FIG. 1d. Then, the user may tap a QQ icon 110 in a search result 100 on the screen D to open QQ, and trigger the terminal device to display a QQ screen. However, in this case, if the user taps a home key 102 to exit the QQ screen, the terminal device displays the screen B shown in FIG. 1b. For another example, when the user forgets the home screen on which the WeChat icon is located, the user may enter "WeChat" in the search box 101 on the screen A shown in FIG. 1a, to trigger the terminal device to display a search result. Then, the user may tap a WeChat icon in the search result to open WeChat, and trigger the terminal device to display a WeChat screen. However, in this case, if the user taps the home key 102 to exit WeChat, the screen B shown in FIG. 1b is still displayed. It can be learned from the foregoing description that, when the user enters a name of an application in the search box on the Hiboard, and opens the application by using an application icon in a search result, after the user taps a home key to exit the screen of the application, the terminal device displays only the first home screen, and the user cannot lean a specific location of the application icon. If the user wants to know the specific location of the application icon, the user needs to search for the application icon on each home screen or locate the application icon by using a locating identifier in the search result, for example, a locating identifier 120 of QQ shown in FIG. 1d. For the user, an operation manner of learning the specific location of the application icon is relatively complex, and interaction efficiency is relatively low.

SUMMARY

This application provides a control method and an electronic device, to help a user learn a location of an application icon, thereby enhancing user experience.

According to a first aspect, a control method in an embodiment of this application is applied to a terminal device, and the method includes:

when the terminal device displays a first home screen, if a preset first input is detected, in response to the first input, opening, by the terminal device, a first application, and displaying a screen of the first application, where the first input is an input of the user for opening the first application; and when the terminal device detects a preset second input, displaying, by the terminal device, a second home screen in response to the second input, where the second home screen is a home screen on which an icon of the first application is located; the second input is an input of the user for exiting the screen of the first application; and the first home screen is different from the second home screen.

According to the foregoing technical solution, after exiting a screen of an application, the terminal device displays a home screen on which an icon of the application is located. Therefore, the user may search the currently displayed home screen for a location of the application icon, without a need to search each home screen for the location of the application icon. This greatly reduces a search range for the user, and enhances operation experience of the user.

In a possible design, when the terminal device displays the first home screen, if a preset third input is detected, in response to the third input, the terminal device opens a second application, and displays a screen of the second application, where the third input is an input of the user for opening the second application; and if a preset fourth input is detected, the terminal device displays a third home screen in response to the fourth input, where the third home screen is a home screen on which an icon of the second application is located; the fourth input is an input of the user for exiting the screen of the second application; and the third home screen is different from the second home screen.

The foregoing technical solution helps narrow a location range in which the user searches for the icon of the second application, thereby enhancing the operation experience of the user.

In a possible design, when detecting the second input, in response to the second input, the terminal device displays the second home screen, and indicates a location of the icon of the first application on the second home screen.

The foregoing technical solution helps improve interaction efficiency, and usability of the terminal device, and avoid a tedious operation of searching for the specific location of the application icon from the home screen by the user.

In a possible design, when the icon of the first application is located in a folder, the terminal device indicates a location of an icon of the folder on the second home screen.

The foregoing technical solution helps improve the interaction efficiency, and the usability of the terminal device, and narrow the location range in which the user searches for the icon of the second application.

In a possible design, the terminal device displays, in response to the second input, an animation in which the screen of the first application is gradually scaled down into the location of the icon of the first application on the second home screen, until the second home screen is displayed.

The foregoing technical solution helps capture attention of the user, and avoid the tedious operation of searching for the specific location of the application icon from the home screen by the user.

In a possible design, after detecting the second input, the terminal device determines, from prestored application icon location information, location information corresponding to the icon of the first application. The location information includes the home screen on which the icon of the first application is located. Alternatively, after detecting the second input, the terminal device sequentially searches home screens from the first to the last for the home screen on which the icon of the first application is located.

The foregoing technical solution helps simplify an implementation of searching for the home screen on which the icon of the first application is located.

In a possible design, the first input includes: tapping, by the user, the icon of the first application in a search result; a voice instruction sent by the user for opening the first application; or tapping, by the user, a task window corresponding to the first application in at least one task window.

The foregoing technical solution facilitates compatibility with an existing operation manner.

In a possible design, the second input includes tapping a home key by the user, tapping a back key by the user or a predefined gesture operation. The predefined gesture operation is used to exit the screen of the first application.

The foregoing technical solution facilitates compatibility with an existing operation manner.

According to a second aspect, an electronic device in an embodiment of this application includes a processor and a memory. The memory stores one or more computer programs. When the one or more computer programs stored in the memory are executed by the processor, the electronic device is enabled to implement the method in the first aspect or any possible design of the first aspect.

According to a third aspect, an embodiment of this application further provides an electronic device, and the electronic device includes a module for performing the method in the first aspect or any possible design of the first aspect.

According to a fourth aspect, an embodiment of this application further provides a computer-readable storage medium. The computer-readable storage medium includes a computer program, and when the computer program is run on an electronic device, the electronic device is enabled to perform the method in the first aspect or any possible design of the first aspect.

According to a fifth aspect, an embodiment of this application further provides a computer program product. When the computer program product is run on an electronic device, the electronic device is enabled to perform the method in the first aspect or any possible design of the first aspect.

In addition, for technical effects brought by any possible design manner in the second to the fifth aspects, refer to technical effects brought by different design manners in the first aspect, and details are not described herein again.

DESCRIPTION OF EMBODIMENTS

Figure 2:
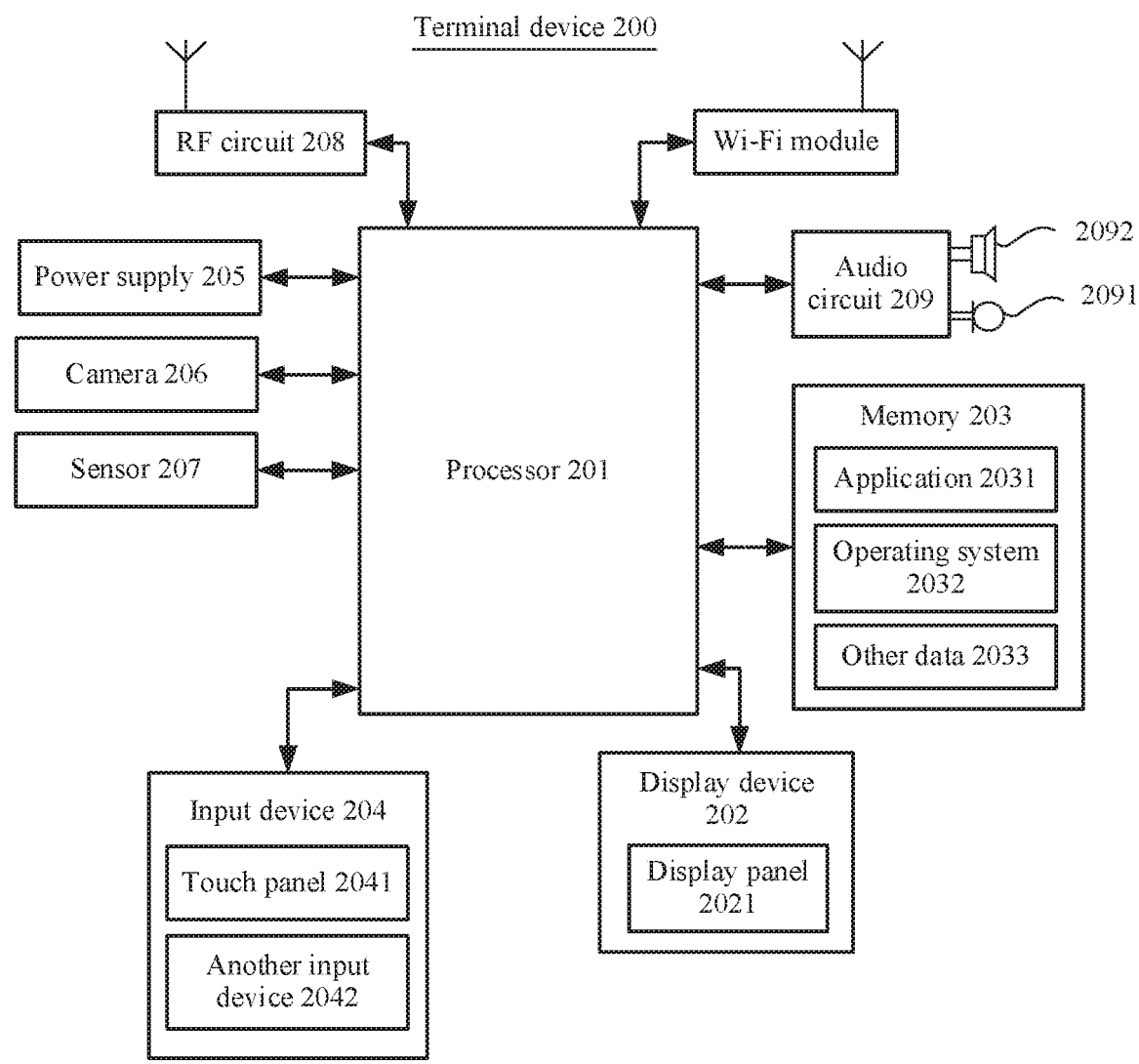
FIG. 2 is a schematic structural diagram of a terminal device to which an embodiment of this application is applicable.

FIG. 2 is a schematic structural diagram of a terminal device to which an embodiment of this application is applicable. Specifically, a terminal device 200 includes a processor 201, a display device 202, a memory 203, and an input device 204.

The processor 201 is configured to read a computer program, and then execute a method defined by the computer program. For example, the processor 201 reads one or more applications, to run an application on the terminal device 200, and display a screen of the application on the display device 202. For example, if the application is WeChat, the processor 202 reads a WeChat program, then runs the WeChat program on the terminal device 200, and displays a WeChat screen on the display device 202. The processor 201 may include one or more general processors, and may further include one or more DSPs (digital signal processor, digital signal processor), and is configured to perform a related operation, to implement a technical solution provided in this embodiment of this application.

The display device 202 includes a display panel 2021, configured to display information entered by a user or information provided for the user, various operation screens of the terminal device 200, and the like. In this embodiment of this application, the display panel 2021 is mainly configured to display a screen, a home screen, and the like of an application installed on the terminal device 200. The home screen in this embodiment of this application is a screen that can be displayed by the display panel 2021, when the terminal device 200 is in a screen-on state after being powered on, and may be a HiBoard or a home screen that is used to display an icon of the application. For example, home screens of the terminal device 200 include the HiBoard, a first home screen, and a second home screen. The HiBoard may be a screen A shown in FIG. a. The first home screen may be a screen B shown in FIG. 1b. The second home screen may be a screen C shown in FIG. 1c. In addition, it should be noted that a quantity of the home screens and a quantity of application icons displayed on each home screen may be correspondingly added or deleted based on a requirement of the user.

Optionally, in this embodiment of this application, the display panel 2021 may be configured in a form of an LCD (liquid crystal display, liquid crystal display), an OLED (organic light-emitting diode, organic light-emitting diode), or the like.

The memory 203 usually includes an internal memory and an external memory. The internal memory may be a random access memory (random access memory, RAM), a read-only memory (read-only memory, ROM), a cache (CACHE), or the like. The external memory may be a hard disk, a compact disc, a universal serial bus (universal serial bus, USB), a floppy disk, a tape drive, or the like. The memory 203 is configured to store a computer program and other data 2033. The computer program includes an operating system 2032, an application 2031, and the like. The other data 2033 may include data generated after the operating system 2032 or the application 2031 is run. The data includes system data (for example, a configuration parameter of an operating system) and user data. For example, a photo taken by the user is typical user data.

The input device 204 is configured to receive digital information, character information, or a contact touch operation/non-contact gesture that is input, and generate a signal input related to a user setting and function control of the terminal device 200, and the like. Specifically, in this embodiment of this application, the input device 204 may include a touch panel 2041. The touch panel 2041, also referred to as a touchscreen, may collect a touch operation performed by the user on or near the touch control panel (for example, an operation performed by the user on or near the touch panel 2041 by using any suitable object or accessory such as a finger or a tablet pen), and may drive a corresponding connection apparatus based on a predetermined program. Optionally, the touch panel 2041 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into touch point coordinates, and then sends the touch point coordinates to the processor 201. Moreover, the touch controller can receive and execute a command sent from the processor 201. In this embodiment of this application, if the touch detection apparatus on the touch panel 2041 detects a pull-down operation on the screen shown in FIG. 1b, the touch detection apparatus sends a signal corresponding to the detected pull-down operation to the touch controller. The touch controller converts the signal into touch point coordinates and sends the touch point coordinates to the processor 201. The processor 201 determines, based on the received touch point coordinates, that the touch operation is the pull-down operation, then invokes, in response to the pull-down operation, a screen shown in FIG. 3 from the memory 203, and displays the screen shown in FIG. 3 on the display panel 2021.

The touch panel 2041 may be implemented by using a plurality of types such as a resistive type, a capacitive type, an infrared type, and a surface acoustic wave type. It should be understood that in this embodiment of this application, the touch panel 2041 may cover the display panel 2021, to form a touch display screen. In addition to the touch panel 2041, the input device 204 may further include another input device 2042. The another input device 2042 may include but is not limited to one or more of a physical keyboard, a function key (such as a volume control key, an on/off key, or a home key), a trackball, a mouse, a joystick, and the like. Therefore, in this embodiment of this application, an operation of triggering an exit from the screen of the application to the home screen is not limited to tapping the home key or a back (back) key, and may also be a gesture operation or the like.

In addition, the terminal device 200 may further include a power supply 205 configured to supply power to another module, and a camera 206 configured to shoot a photo or a video. The terminal device 200 may further include one or more sensors 207, for example, an acceleration sensor, an optical sensor, or a pressure sensor. Therefore, in this embodiment of this application, a manner of triggering an exit of the screen of the application may be detecting pressure in a specific area, or the like.

The terminal device 200 may further include a radio frequency (radio frequency, RF) circuit 208 for network communication with a wireless network device. In addition, the terminal device 200 may further include an audio circuit 209, a microphone 2091, and a loudspeaker 2092, and may provide an audio interface between the user and the terminal device 200. The audio circuit 209 may be configured to convert audio data into a signal that can be identified by the loudspeaker 2092, and transmit the signal to the loudspeaker 2092. The loudspeaker 2092 converts the signal into a sound signal for output. The microphone 2091 is configured to collect an external sound signal (for example, a sound of a person speaking, or another sound), convert the collected external sound signal into a signal that can be identified by the audio circuit 209, and send the signal to the audio circuit 209. The audio circuit 209 may further be configured to convert the signal sent by the microphone 2091 into the audio data, and then output the audio data to the RF circuit 208 for sending to, for example, another mobile phone, or output the audio data to the memory 203 for subsequent processing. In addition, the terminal device 200 further includes a wireless fidelity (wireless fidelity, Wi-Fi) module, configured to communicate with another Wi-Fi device.

Although not shown, the terminal device 200 may further include a flash and the like. Details are not described herein.

The terminal device in this embodiment of this application may also be referred to as a terminal, user equipment (user equipment, UE), or the like. For example, the terminal device may be a mobile phone, a tablet computer (pad), a notebook computer, a personal digital assistant (personal digital assistant, PDA), a point of sales (point of sales, POS), a vehicle-mounted computer, a smart speaker, a set top box, an augmented reality (augmented reality, AR) device, a virtual reality (virtual reality, VR) device, or the like. This is not limited.

To help guide a user to find a home screen on which an application icon is located, deepen memory of the user for a location of the application icon, and enhance operation experience of the user, an embodiment of this application provides a control method, in which no matter how the user triggers a terminal device to open an application, after exiting a screen of the application, the terminal device displays the home screen on which the application icon is located.

For example, an icon of a first application is on a first home screen; an icon of a second application is on a second home screen; and the first home screen is different from the second home screen. If the user separately triggers, by using a same entry screen, the terminal device to open the first application and the second application, to ensure that the first home screen is displayed after the terminal device exits a screen of the first application, and the second home screen is displayed after the terminal device exits a screen of the second application, reference may be made to the control method shown in FIG. 4. Specifically, the following steps are included.

Step 410: When displaying the entry screen, the terminal device performs step 420 if a first input is detected, or performs step 450 if a third input is detected. The first input is an input of the user for opening the first application, and the third input is an input of the user for opening the second application.

Step 420: In response to the first input, the terminal device opens the first application, and displays the screen of the first application.

It should be noted that opening the first application means that the terminal device invokes a program of the first application and runs the program of the first application.

Step 430: The terminal device detects a second input when displaying the screen of the first application. The second input is an input of the user for exiting the screen of the first application.

Step 440: The terminal device displays the first home screen in response to the second input. The first home screen is a home screen on which the icon of the first application is located, and the procedure ends.

Step 450: In response to the third input, the terminal device opens the second application, and displays the screen of the second application.

It should be noted that opening the second application means that the terminal device invokes a program of the second application and runs the program of the second application.

Step 460: The terminal device detects a fourth input when displaying the screen of the second application. The fourth input is an input of the user for exiting the screen of the second application.

Step 470: The terminal device displays the second home screen in response to the fourth input. The second home screen is a home screen on which the icon of the second application is located, and the procedure ends.

It should be noted that the screen of the first application displayed by the terminal device in step 420 and step 430 may be a same screen, or may be different screens. This is not limited. The screen of the second application displayed by the terminal device in step 450 and step 460 may be a same screen, or may be different screens. This is not limited.

The entry screen in this embodiment of this application is any home screen. For example, the entry screen may be a HiBoard, or may be any home screen used to display an application icon. This is not limited. It should be noted that, in this embodiment of this application, the entry screen, the home screen on which the first application is located, and the home screen on which the second application is located may be a same home screen, or may be different home screens.

For example, home screens that may be displayed by the terminal device include the HiBoard, the first home screen, and the second home screen. The HiBoard is the screen A shown in FIG. 1a. The first home screen is the screen B shown in FIG. 1b. The second home screen is the screen C shown in FIG. 1c. It can be learned from the screen A shown in FIG. 1a that the HiBoard includes a search box 101, a date, a widget (widget) 102 of a next schedule, and a weather widget 103. In addition, the user may further add or delete a widget of an application displayed on the HiBoard by tapping "Edit" displayed on the HiBoard. It can be learned from the screen B shown in FIG. 1b that a QQ icon is on the second home screen. It can be learned from the screen C shown in FIG. 1e that a WeChat icon is on a third home screen.

Figure 1A:
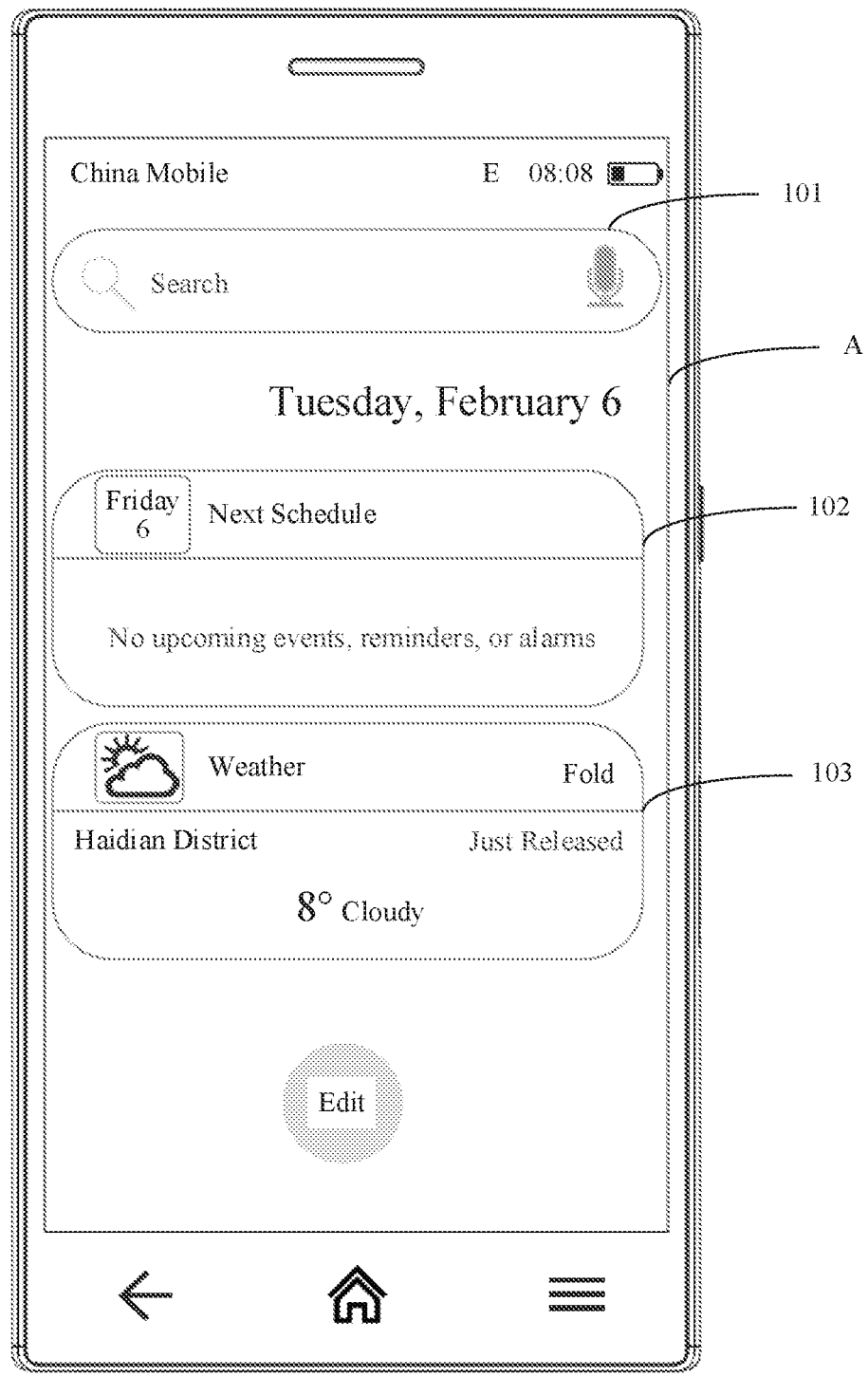
FIG. 1a is a schematic diagram of a screen of a HiBoard according to an embodiment of this application.
Figure 1B:
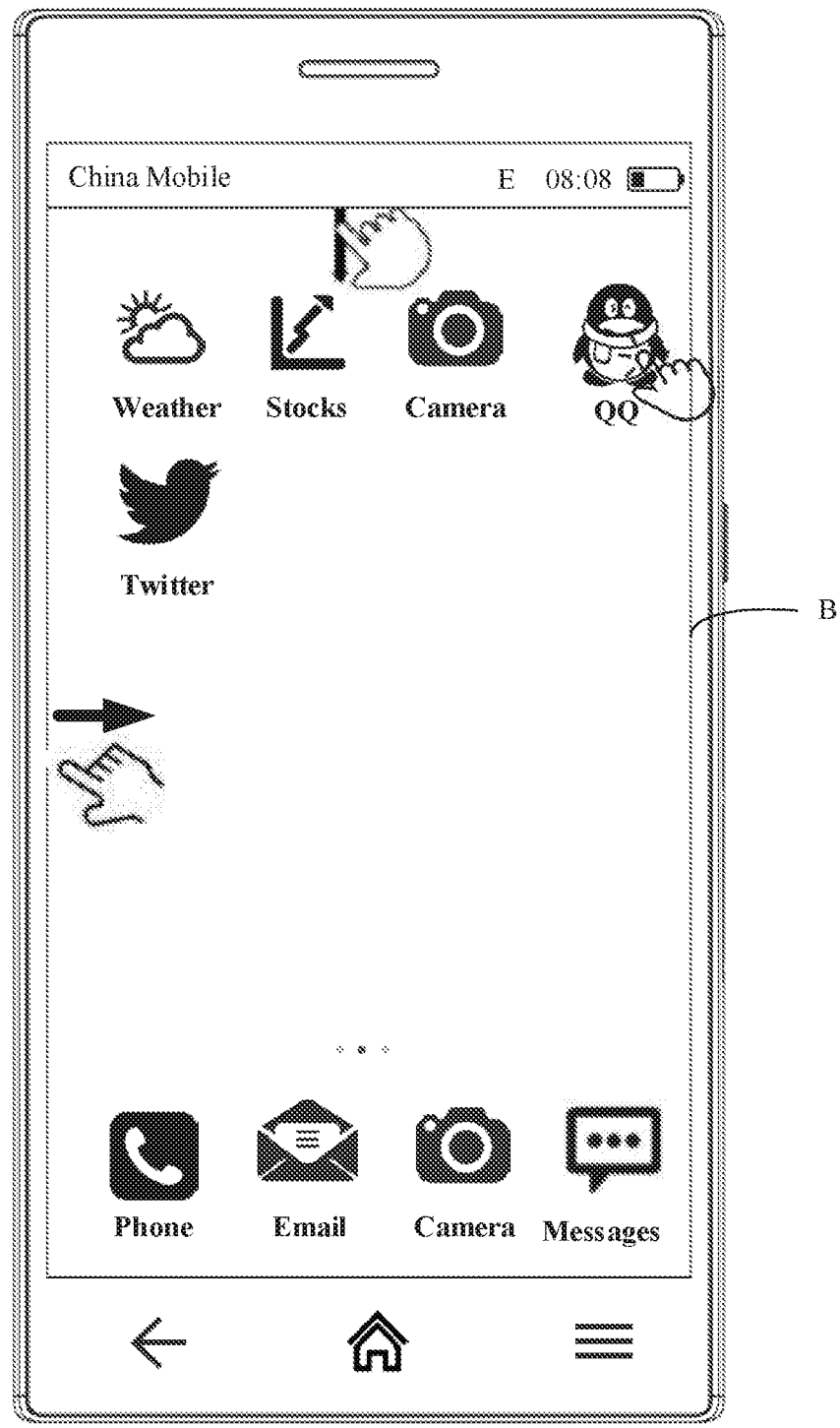
FIG. 1b is a schematic diagram of a first home screen according to an embodiment of this application.
Figure 5A:
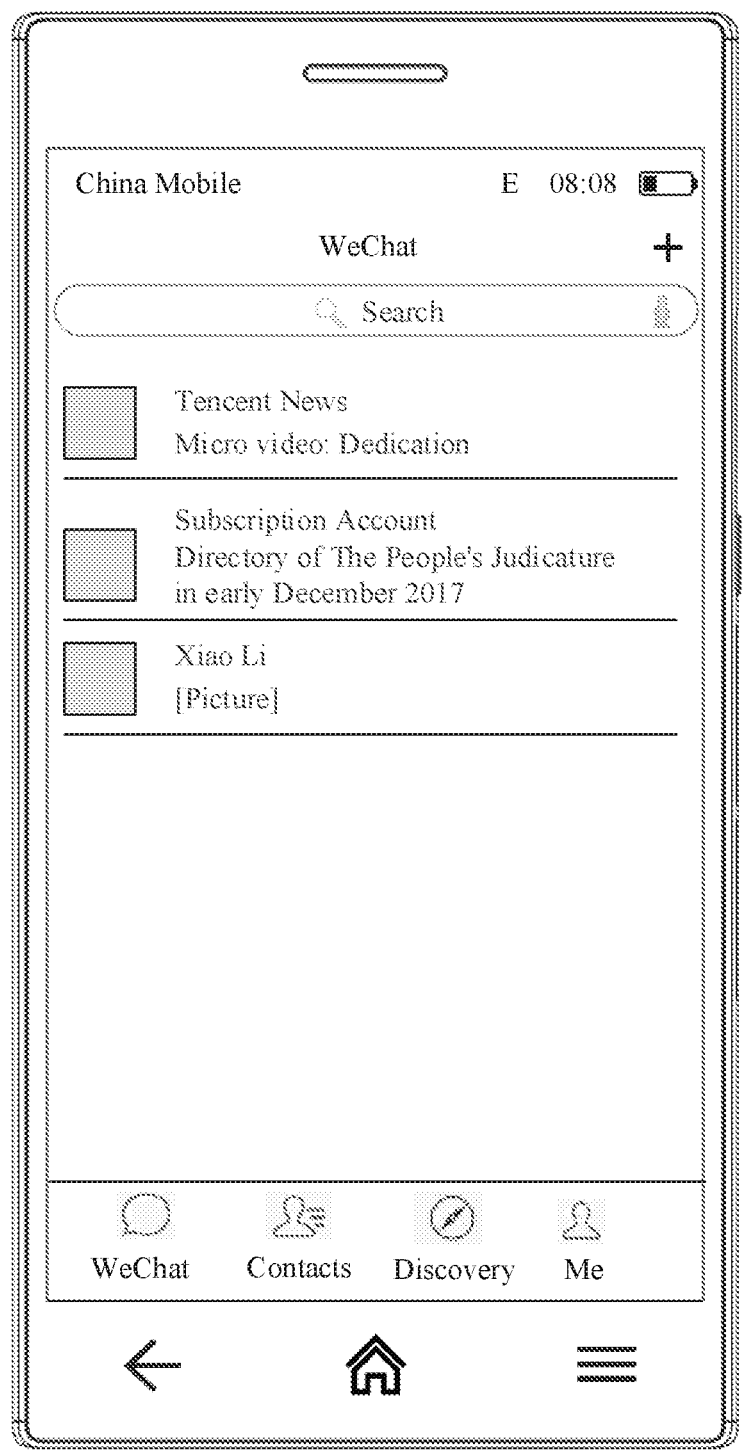
FIG. 5a is a schematic diagram of a WeChat screen displayed by a terminal device according to an embodiment of this application.

An example in which the entry screen is the screen B shown in FIG. 1b is used. When the terminal device displays the screen B shown in FIG. 1b, if the terminal device detects an input of the user for opening WeChat, in response to the input of the user for opening WeChat, the terminal device opens WeChat and displays a WeChat screen. For example, the WeChat screen displayed by the terminal device in response to the input of the user for opening WeChat may be a screen shown in FIG. 5a. When displaying the WeChat screen, if the terminal device detects an input of the user for exiting the WeChat screen, the terminal device displays, in response to the input of the user for exiting the WeChat screen, the screen C shown in FIG. 1c on which the WeChat icon is located. For example, when the terminal device detects the input of the user for exiting the WeChat screen, the displayed WeChat screen may be the screen shown in FIG. 5a, or may be a screen shown in FIG. 5b, or the like. This is not limited. In addition, when displaying the screen B shown in FIG. 1b, if the terminal device detects an input of the user for opening QQ, in response to the input of the user for opening QQ, the terminal device opens QQ and displays a QQ screen. For example, the QQ screen displayed by the terminal device in response to the input of the user for opening QQ may be a screen shown in FIG. 6. Based on this scenario, if the terminal device detects an input of the user for exiting the QQ screen, the terminal device displays, in response to the input of the user for exiting the QQ screen, the screen B shown in FIG. 1b on which the QQ icon is located.

The following specifically describes different preset input manners of the user for opening an application.

For example, the home screens that may be displayed by the terminal device include the HiBoard, the first home screen, and the second home screen. The HiBoard is the screen A shown in FIG. 1a. The first home screen is the screen B shown in FIG. 1b. The second home screen is the screen C shown in FIG. 1c. When the terminal device displays the screen B shown in FIG. 1b, WeChat is used as an example to describe in detail different input manners of the user for opening WeChat.

In an optional manner, when displaying the screen B shown in FIG. 1b, the terminal device detects a rightward swiping operation, and displays the screen A shown in FIG. 1a in response to the rightward swiping operation. When detecting an operation of entering "WeChat" in the search box 101 on the screen A shown in FIG. 1a by the user, the terminal device displays a search result on the screen A in response to the operation of entering "WeChat" in the search box 101 by the user. When detecting that the user taps a WeChat icon in the search result, in response to the operation of tapping the WeChat icon in the search result by the user, the terminal device opens WeChat, and displays the WeChat screen.

In another optional manner, when displaying the screen B shown in FIG. 1b, the terminal device detects a downward swiping operation, and displays, in response to the downward swiping operation, a notification screen including a search box. For example, the notification screen including a search box may be a screen shown in FIG. 3. When detecting the operation of entering "WeChat" in the search box 101 on the screen A shown in FIG. 1a by the user, the terminal device displays the search result on the screen A in response to the operation of entering "WeChat" in the search box 101 by the user. When detecting that the user taps the WeChat icon in the search result, the terminal device opens WeChat, and displays the WeChat screen, in response to the operation of tapping the WeChat icon in the search result by the user.

In addition, it should be noted that when displaying the screen B shown in FIG. 1b, the terminal device may further display, in response to an upward swiping operation when the upward swiping operation is detected, the notification screen including a search box. A user operation manner for triggering the terminal device to display the notification screen including a search box is not limited in this embodiment of this application.

Figure 7:
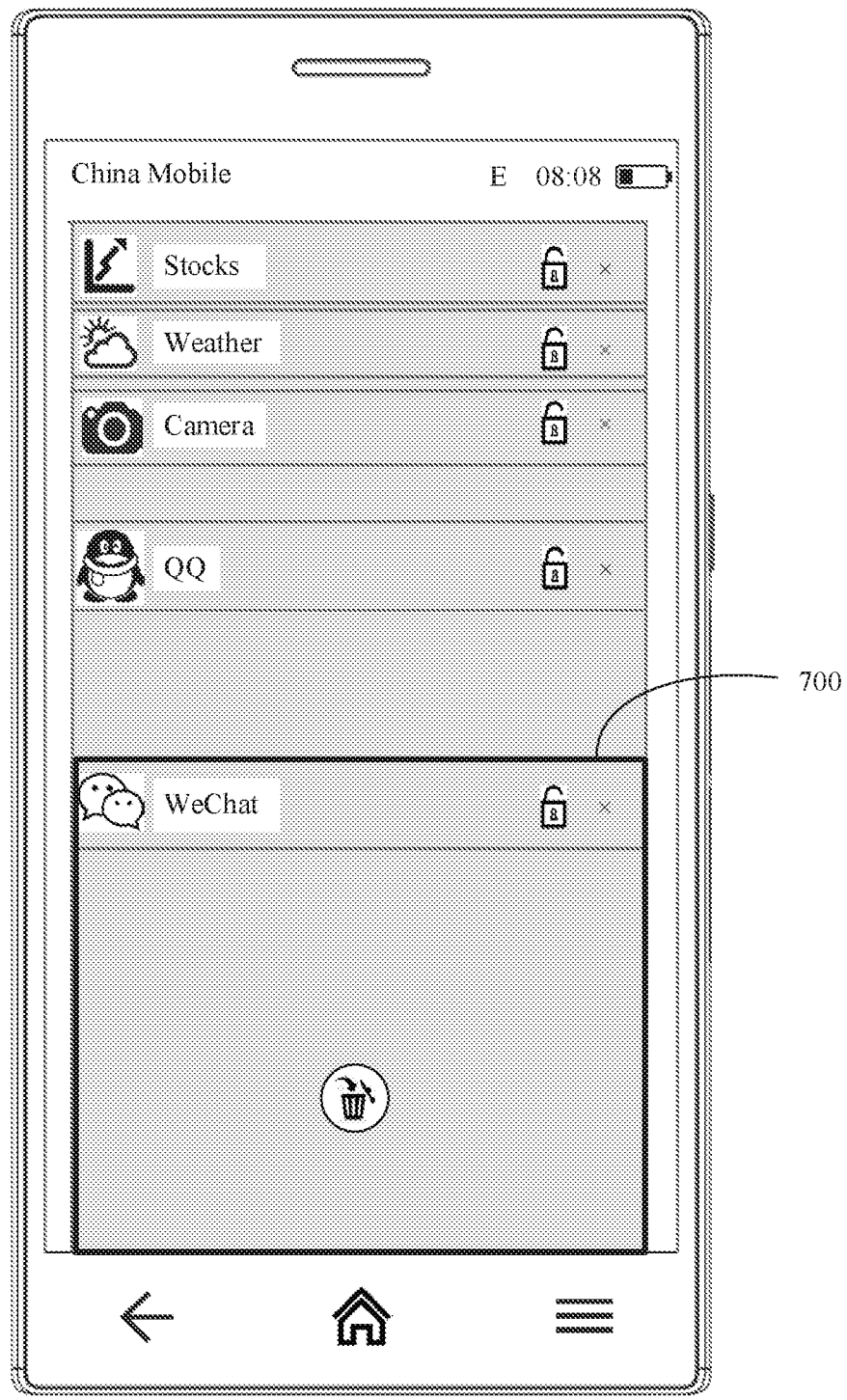
FIG. 7 is a schematic diagram of a screen with multiple task windows displayed by a terminal device according to an embodiment of this application.

In another optional manner, when displaying the screen B shown in FIG. 1b, the terminal device detects an operation of triggering display of a screen with multiple task windows by the user, and displays the screen with multiple task windows in response to the operation of triggering display of a screen with multiple task windows by the user. For example, the screen with multiple task windows displayed by the terminal device is a screen shown in FIG. 7. The terminal device detects an operation of tapping a task window 700 of WeChat on the screen shown in FIG. 7 by the user, and in response to the operation of tapping the task window 700 of WeChat on the screen shown in FIG. 7 by the user, opens WeChat, and displays the WeChat screen.

The operation of triggering display of the screen with multiple task windows by the user is not limited in this embodiment of this application. For example, the operation may be tapping a home key twice consecutively, pressing a left boundary of a screen displayed by the terminal device, or the like.

Figure 8A:
FIG. 8a is a schematic diagram of a voice input screen displayed by a terminal device according to an embodiment of this application.
Figure 8B:
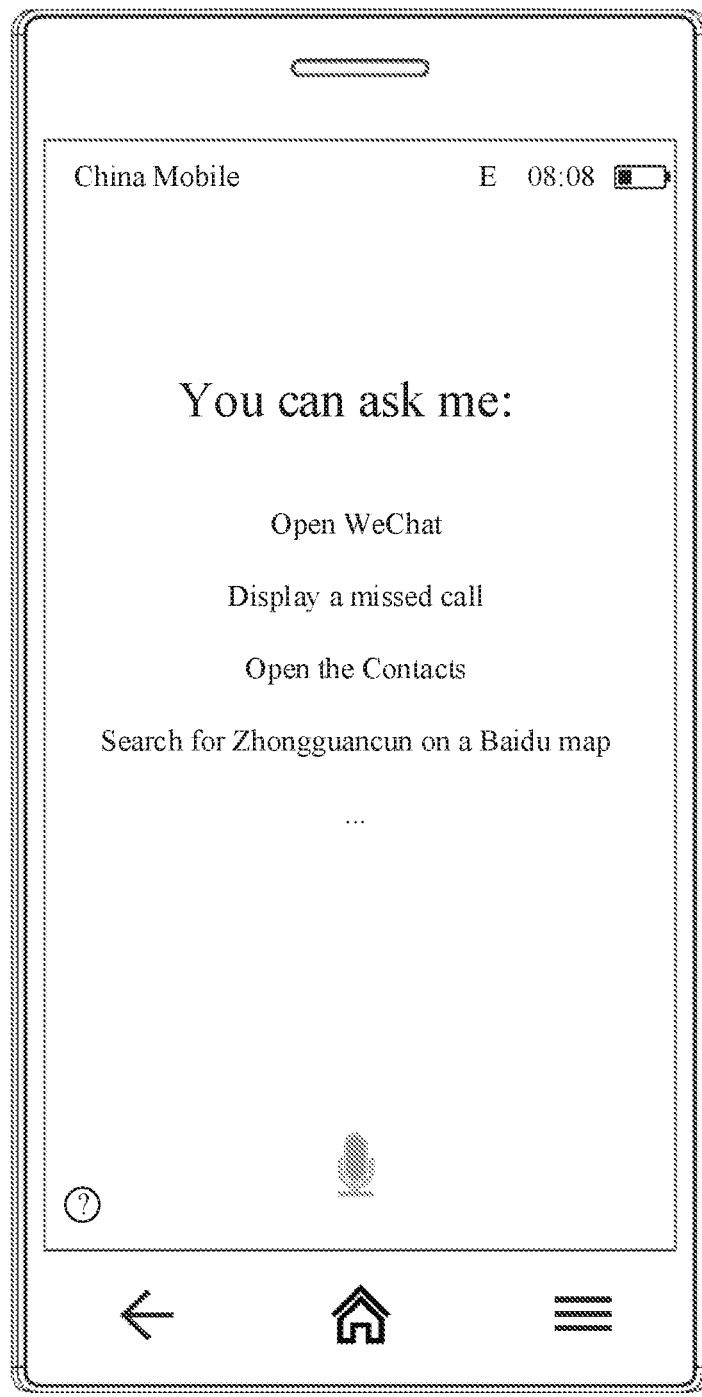
FIG. 8b is a schematic diagram of a voice input screen displayed by a terminal device according to an embodiment of this application.

In an optional manner, when displaying the screen B shown in FIG. 1b, the terminal device detects an operation of triggering display of a screen for inputting a voice instruction by the user, and displays the screen for inputting a voice instruction in response to the operation of triggering display of a screen for inputting a voice instruction by the user. For example, the screen for inputting a voice instruction may be a screen shown in FIG. 8a, or may be a screen shown in FIG. 8b. If the terminal device detects that the user sends a voice instruction "WeChat" or "Open WeChat", in response to the voice instruction "WeChat" or "Open WeChat" sent by the user, the terminal device opens WeChat, and displays the WeChat screen.

Figure 1C:
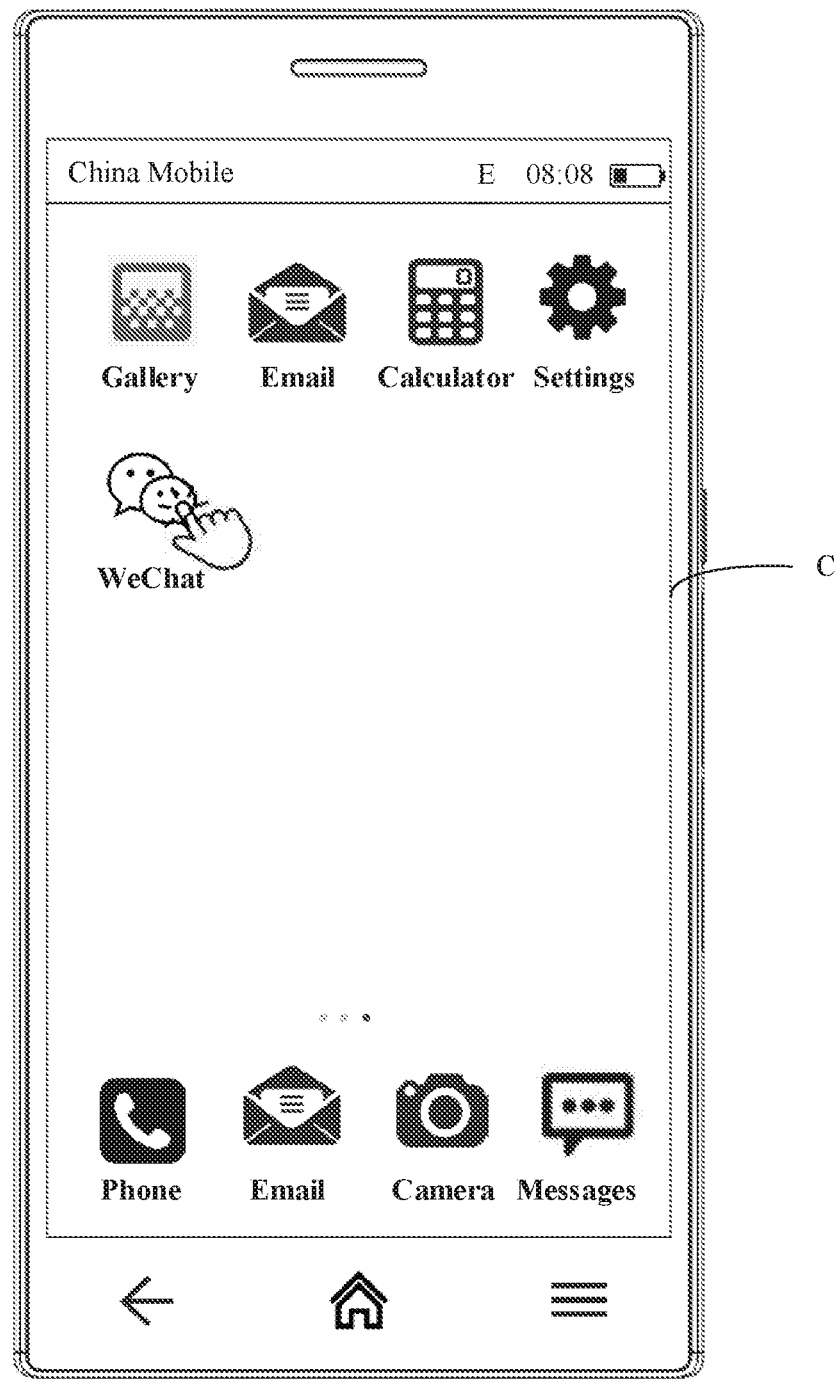
FIG. 1c is a schematic diagram of a second home screen according to an embodiment of this application.

After the terminal device detects that the user opens WeChat in either of the foregoing input manners, and displays the WeChat screen, if an input of the user for exiting the WeChat screen is detected, the terminal device displays the screen C shown in FIG. 1c in response to the input of the user for exiting the WeChat screen.

According to the foregoing technical solution, no matter how the user opens a screen of an application, after exiting the screen of the application, the terminal device displays a home screen on which an icon of the application is located. Therefore, the user may search the currently displayed home screen for a location of the application icon, without a need to search each home screen for the location of the application icon. This greatly reduces a search range for the user.

In addition, in this embodiment of this application, the input of the user for exiting the screen of the application may be preset. This is not limited. For example, the input is tapping the home key, double-tapping the home key, tapping a back (back) key, an operation on a virtual navigation key or a virtual home key, a predefined gesture operation (for example, a pull-up operation on a virtual key), or the like.

Further, to improve interaction efficiency, and usability of the terminal device, and avoid a tedious operation of searching for the specific location of the application icon from the home screen by the user, optionally, in response to the input of the user for exiting the screen of the application, the terminal device displays the home screen on which the application icon is located, and indicates the location of the application icon on the home screen.

For example, in step 440, in response to the second input, the terminal device displays the first home screen on which the icon of the first application is located, and indicates a location of the icon of the first application on the first home screen. In step 470, in response to the fourth input, the terminal device displays the second home screen on which the icon of the second application is located, and indicates a location of the icon of the second application on the second home screen.

Optionally, the terminal device displays, in response to the input of the user for exiting the screen of the application, an animation in which the screen of the application is gradually scaled down into the location of the application icon on the screen on which the application icon is displayed, until the terminal device displays the screen on which the application icon is located.

Figure 6:
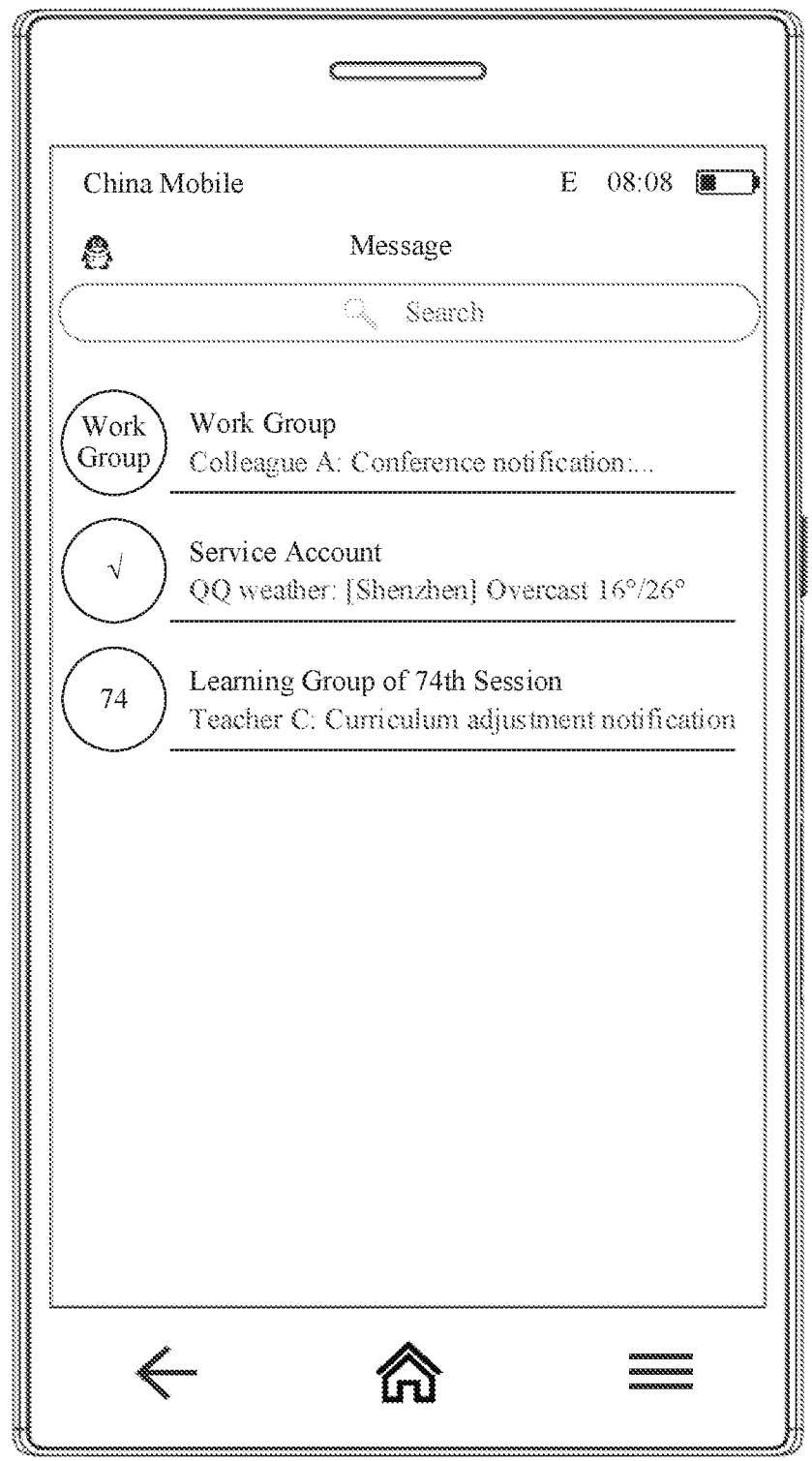
FIG. 6 is a schematic diagram of a QQ screen displayed by a terminal device according to an embodiment of this application.
Figure 9:
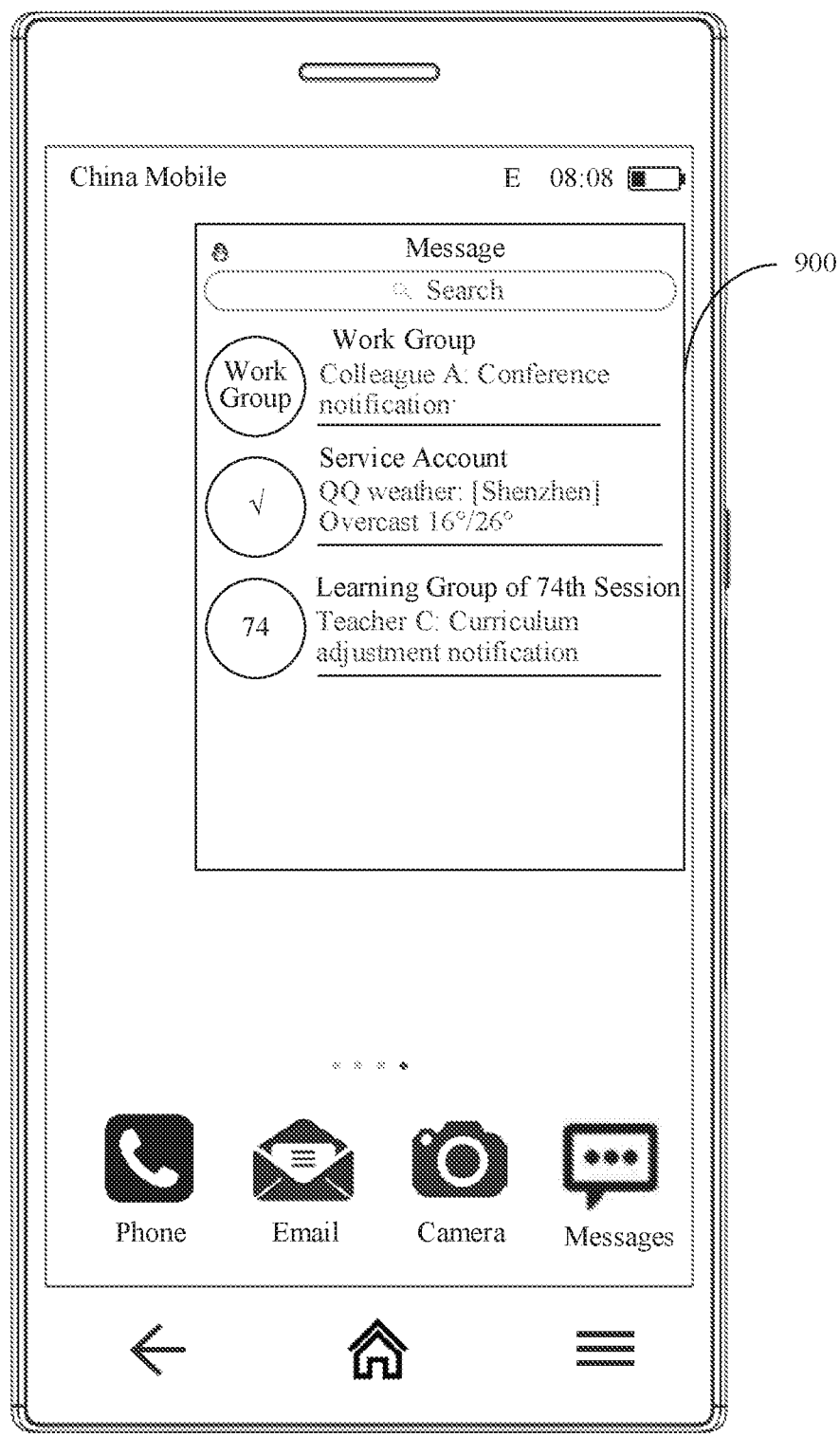
FIG. 9 is a schematic diagram of a screen displayed by a terminal device in a process of scaling down a QQ screen according to an embodiment of this application.
Figure 10:
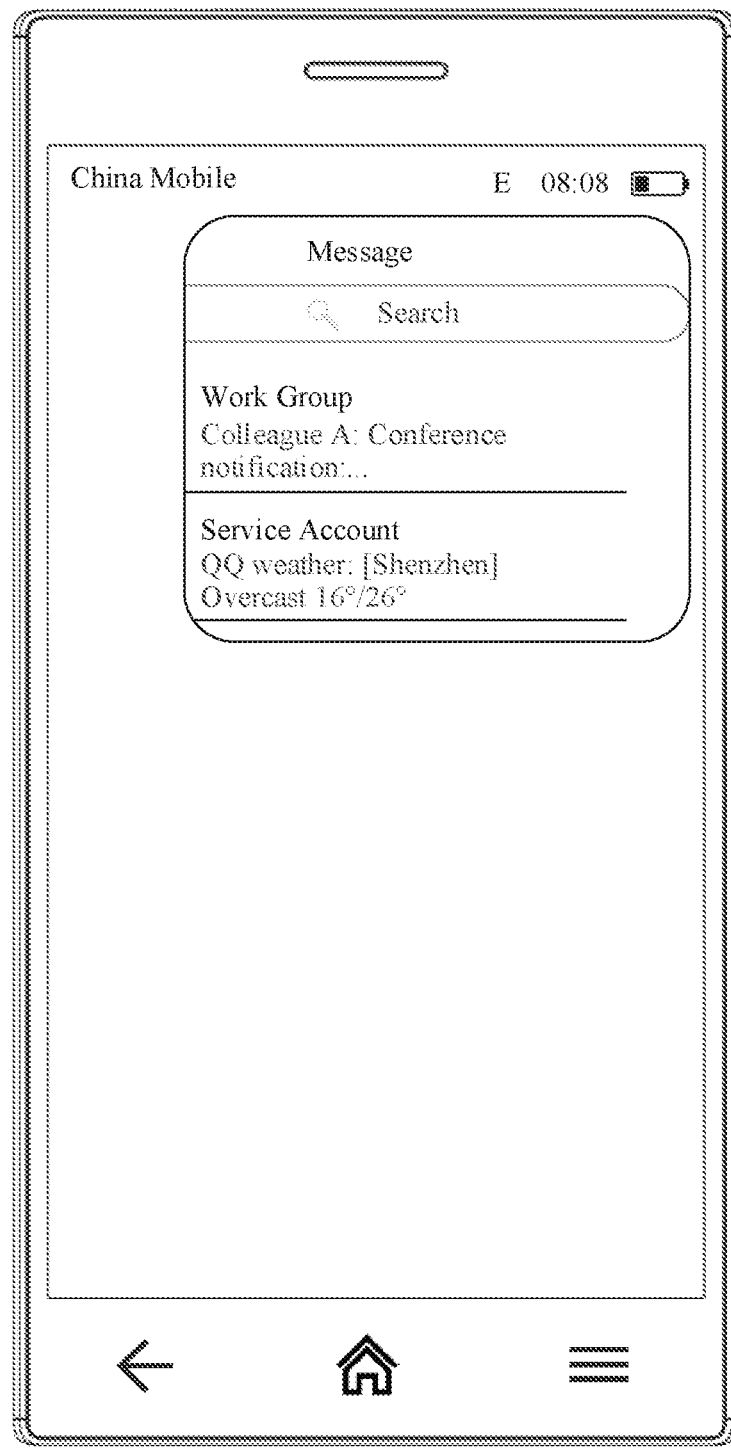
FIG. 10 is a schematic diagram of a screen displayed by a terminal device in a process of scaling down a QQ screen according to an embodiment of this application.

An example in which the QQ icon is located on the screen B shown in FIG. 1b is used. For example, the terminal device displays, in response to an input of the user for exiting the QQ screen shown in FIG. 6, an animation in which the QQ screen shown in FIG. 6 is gradually scaled down into a location of the QQ icon on the screen B shown in FIG. 1b, until the screen B shown in FIG. 1b is completely displayed. For example, the QQ screen shown in FIG. 6 keeps a shape unchanged, and is gradually scaled down into the location of the QQ icon on the screen B shown in FIG. 1b. A screen shown in FIG. 9 is a schematic diagram of a screen in a process in which the QQ screen shown in FIG. 6 keeps the shape unchanged and is gradually scaled down into the location of the QQ icon on the screen B shown in FIG. 1b. For another example, a screen shown in FIG. 10 is a schematic diagram of a screen in a process in which the QQ screen shown in FIG. 6 gradually disappears from an edge of the QQ screen into the location of the QQ icon on the screen B shown in FIG. 1b.

For example, the QQ screen shown in FIG. 6 keeps the shape unchanged, and is gradually scaled down into the location of the QQ icon on the screen B shown in FIG. 1b. After the QQ screen shown in FIG. 6 is scaled down to an extent, the QQ screen may be converted into the QQ icon, until a size and a location of the QQ icon are scaled down to a size and into the location of the QQ icon on the screen B shown in FIG. 1b. Optionally, a screen at a corresponding location on the screen B shown in FIG. 1b may be displayed in a display area other than the QQ screen on the screen shown in FIG. 9.

For example, the QQ screen shown in FIG. 6 gradually disappears from an edge of the QQ screen into the location of the QQ icon on the screen B shown in FIG. 1b. After an area of the QQ screen shown in FIG. 6 that can be displayed on the terminal device reaches an extent, the QQ icon is displayed in an area of the terminal device in which the QQ screen can be displayed until the size and the location of the QQ icon are scaled down to the size and into the location of the QQ icon on the screen B shown in FIG. 1b. Optionally, the screen at the corresponding location on the screen B shown in FIG. 1b may be displayed in a display area other than an area in which the QQ screen can be displayed on the screen shown in FIG. 10.

Figure 5B:
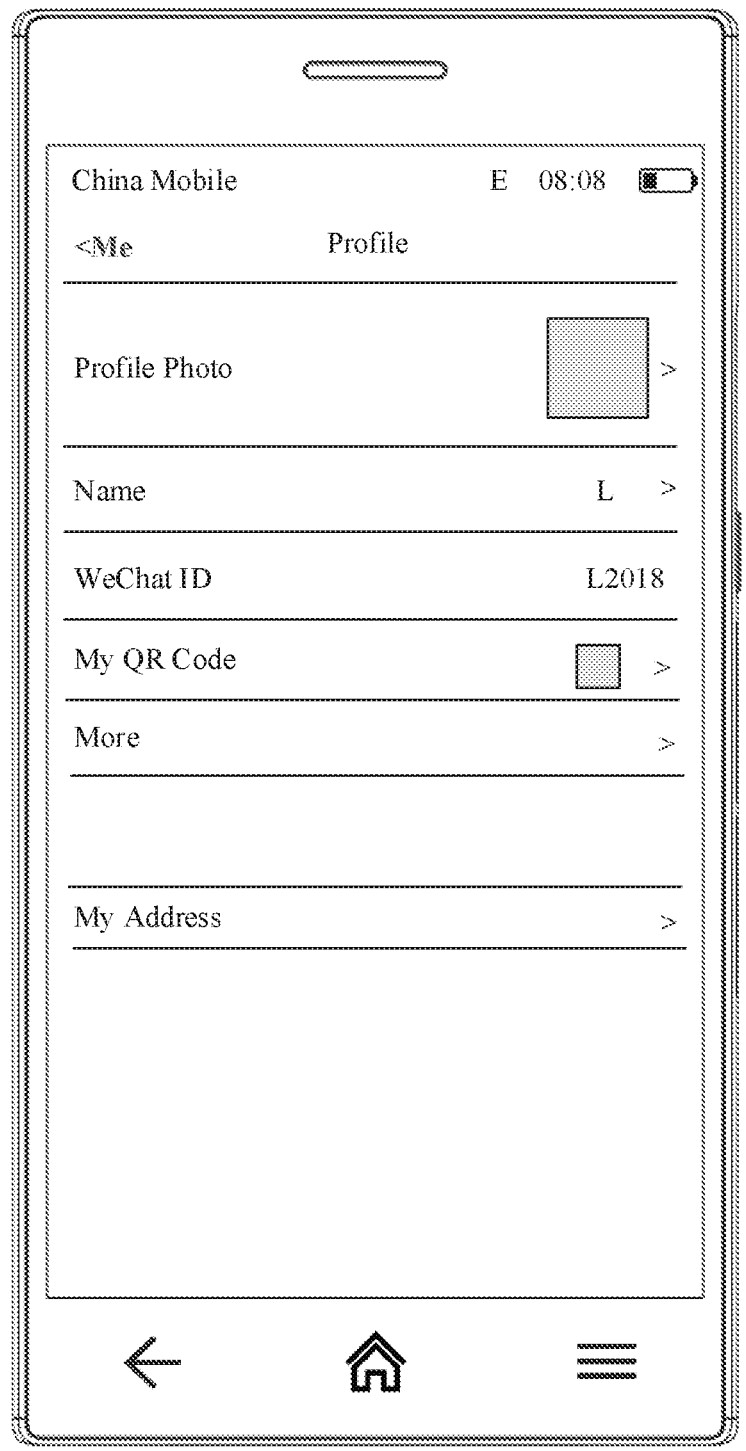
FIG. 5b is a schematic diagram of a WeChat screen displayed by a terminal device according to an embodiment of this application.
Figure 11:
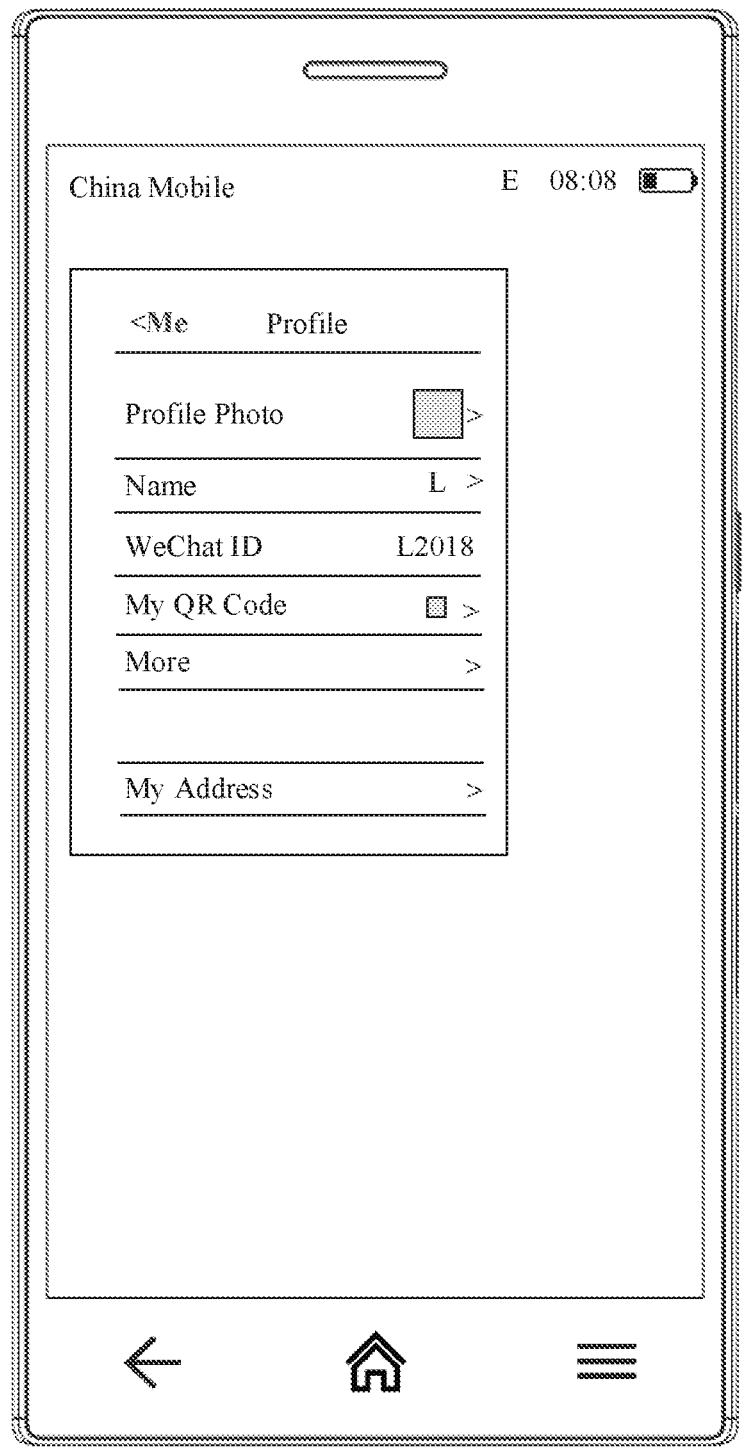
FIG. 11 is a schematic diagram of a screen displayed by a terminal device in a process of scaling down a WeChat screen according to an embodiment of this application.

An example in which the WeChat icon is located on the screen C shown in FIG. 1c is used. For example, the terminal device displays, in response to an input of the user for exiting the WeChat screen shown in FIG. 5b, an animation in which the WeChat screen shown in FIG. 5b is gradually scaled down into a location of the WeChat icon on the screen C shown in FIG. 1c, until the display panel 2021 completely displays the screen C shown in FIG. 1c. For example, a screen shown in FIG. 11 is a schematic diagram of a screen in a process in which the WeChat screen shown in FIG. 5b keeps a shape unchanged and is gradually scaled down into the location of the QQ icon on the screen B shown in FIG. 1c.

An effect of the animation in which the screen of the application is gradually scaled down into the location of the application icon on the screen on which the application icon is displayed is not limited in this embodiment of this application.

Figure 4:
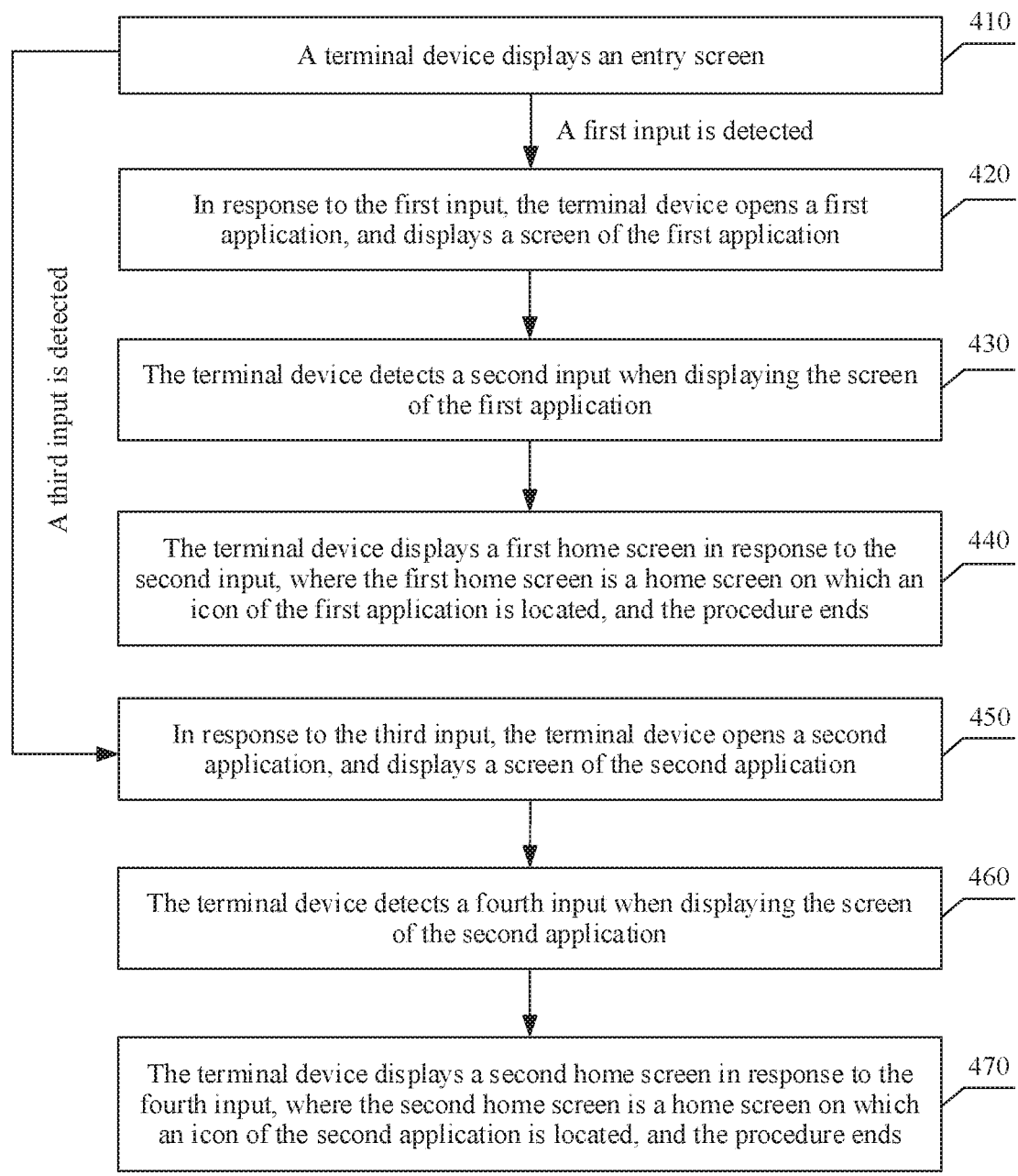
FIG. 4 is a schematic flowchart of a control method according to an embodiment of this application.

In addition, in the control method shown in FIG. 4, if the icon of the first application is located in a first folder on the first home screen, the terminal device displays the first home screen in response to the second input in step 440, where the first home screen is a home screen on which an icon of the first folder is located. In the control method shown in FIG. 4, when the icon of the second application is located in a second folder on the second home screen, the terminal device displays the second home screen in response to the fourth input in step 470, where the second home screen is a home screen on which an icon of the second folder is located.

Figure 12:
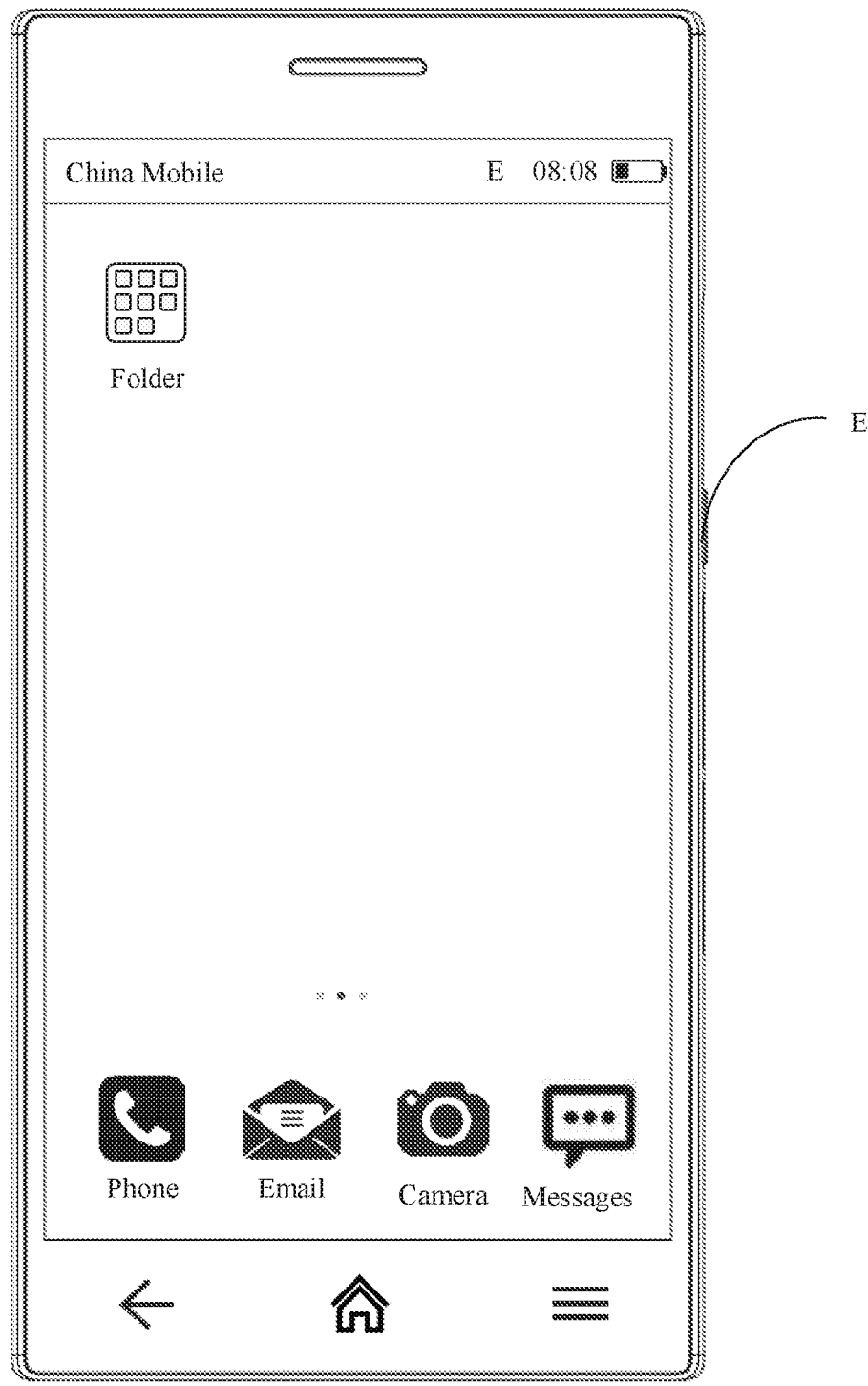
FIG. 12 is a schematic diagram in which a terminal device displays a home screen on which a folder is located according to an embodiment of this application.
Figure 13:
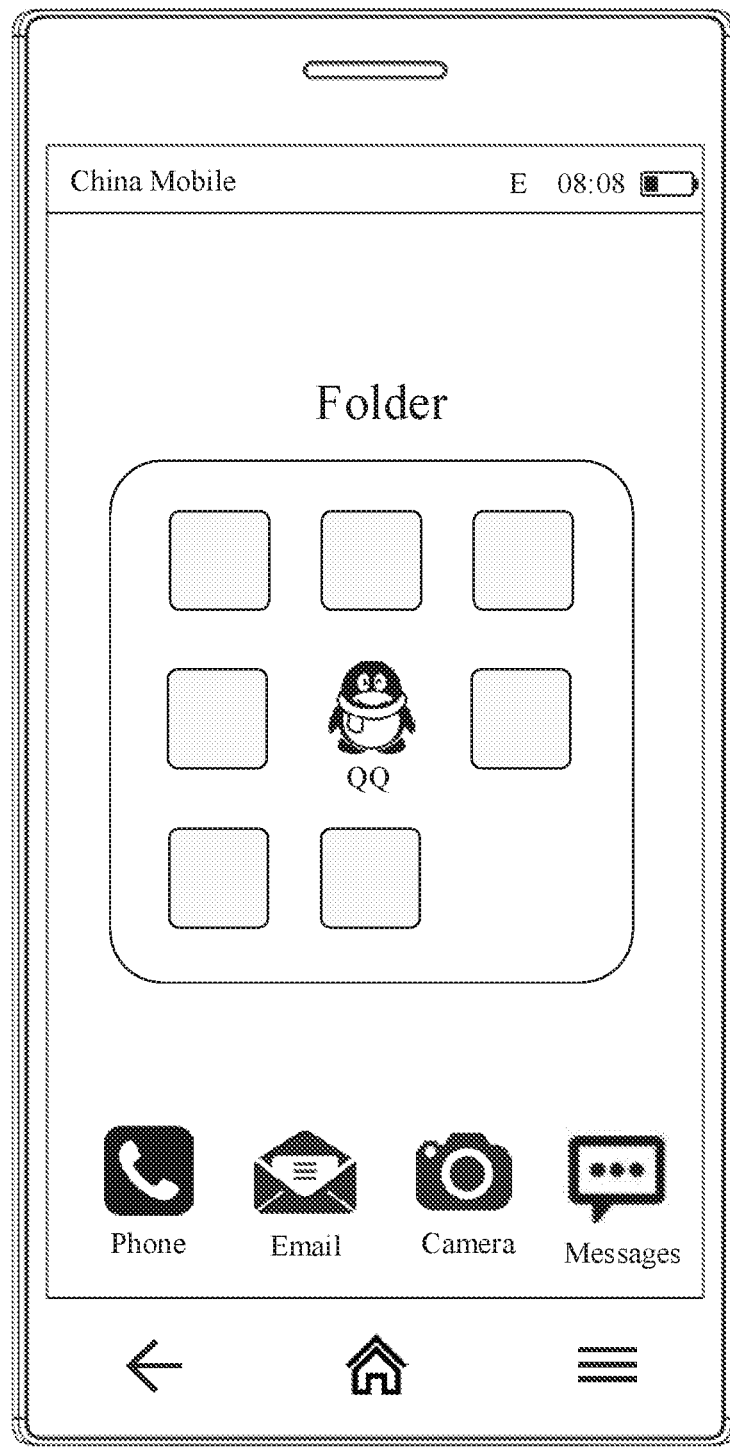
FIG. 13 is a schematic diagram in which a terminal device displays a location of a QQ icon in a folder according to an embodiment of this application.

For example, the home screens of the terminal device include the HiBoard, the first home screen, and the second home screen. The HiBoard is the screen A shown in FIG. 1a. The first home screen is a screen E shown in FIG. 12. The second home screen is the screen C shown in FIG. 1c. It can be learned from FIG. 12 that the screen E includes an icon of a folder. When displaying the screen E, the terminal device detects an operation of tapping the icon of the folder, and displays, in response to the operation of tapping the icon of the folder, a screen shown in FIG. 13. It can be learned from the screen shown in FIG. 13 that a QQ icon is located in the folder.

Based on the foregoing scenario, when displaying the screen C shown in FIG. 1c, the terminal device detects an input of the user for opening QQ, and in response to the input of the user for opening QQ, opens QQ, and displays a QQ screen. When displaying the QQ screen, the terminal device detects an input of the user for exiting the QQ screen, and in response to the input of the user for exiting the QQ screen, displays the screen E shown in FIG. 12, and indicates a location of the icon of the folder on the screen E, or indicates a location of the QQ icon in the folder.

Optionally, a manner of indicating the location of the QQ icon is: In response to the input of the user for exiting the QQ screen, the terminal device displays that the QQ screen is gradually scaled down into the location of the folder on the screen E shown in FIG. 12, and displays the screen shown in FIG. 13 after the QQ screen is scaled down to an extent. Then the terminal device displays the screen E shown in FIG. 12 after displaying the screen shown in FIG. 13 for preset duration. The preset duration may be correspondingly preset based on an actual situation, or may be set or modified by the user.

In addition, it should be noted that when displaying the screen of the application, the terminal device detects the input of the user for exiting the screen of the application, determines the home screen on which the application icon is located, and then displays, in response to the input of the user for exiting the screen of the application, the home screen on which the application icon is located.

Optionally, a manner of determining the home screen on which the application icon is located is: The terminal device searches pre-stored application icon location information for location information of the application icon corresponding to the input of the user for exiting the screen of the application. Optionally, when the user opens the application by directly tapping the application icon on the home screen, the location information of the application icon, for example, the home screen on which the application icon is located, a folder in which the application icon is located, and a specific location of the application icon on the home screen or in the folder, is stored in a cache (for example, an openList).

Optionally, another manner of determining the home screen on which the application icon is located is: The terminal device searches, starting from the first home screen, for a location of the application icon corresponding to the input of the user for exiting the screen of the application.

For example, the home screens of the terminal device include the HiBoard, the first home screen, and the second home screen. The HiBoard is the screen A shown in FIG. 1*a*. The first home screen is the screen B shown in FIG. 1*b*. The second home screen is the screen C shown in FIG. 1*c*. The QQ icon is used as an example. The terminal device may search the openList for location information corresponding to the QQ icon, or may search for the location information corresponding to the QQ icon from the first home screen to the second home screen.

When the application icon is located in a folder on the home screen, the terminal device detects the input of the user for exiting the screen of the application, determines the home screen on which the folder of the application icon is located, and then displays, in response to the input of the user for exiting the screen of the application, the home screen on which the folder of the application icon is located.

A manner of determining the home screen on which the folder of the application icon is located is similar to the manner of determining the home screen on which the application icon is located. Details are not described herein again.

It should be further noted that, when a desktop of the terminal device is set as a drawer screen, an application icon on a home screen is an icon of an application shortcut. The application cannot be uninstalled by deleting the application icon on the home screen. A corresponding application can be deleted from the terminal device only by deleting an application icon on the drawer desktop. The drawer screen includes icons of all applications installed on the terminal device, and application icons on the home screen may be icons of some or all the applications installed on the terminal device. In addition, there may be a plurality of duplicated application icons on the home screen.

Figure 14:
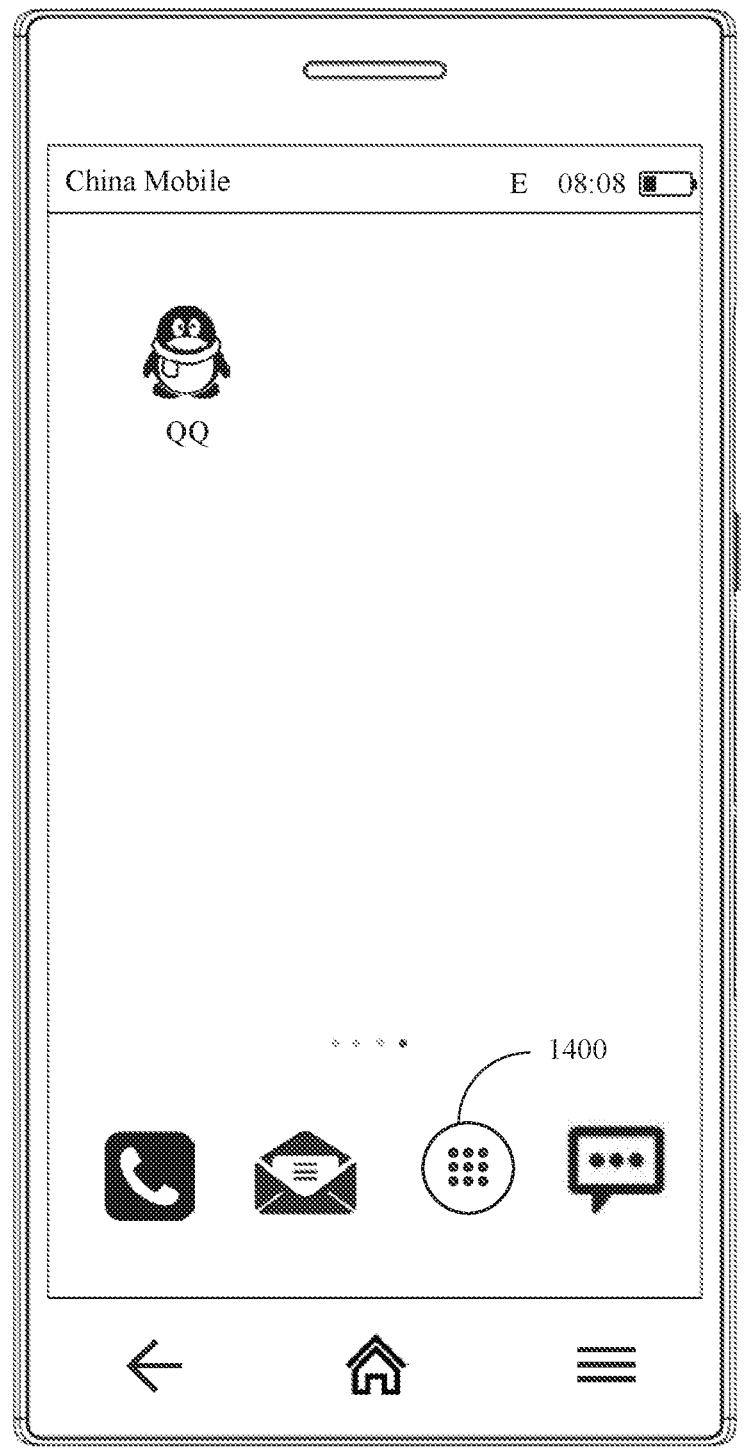
FIG. 14 is a schematic diagram of a home screen displayed by a terminal device in a setting drawer screen according to an embodiment of this application.

For example, as shown in FIG. 14, when detecting an operation of tapping an icon 1400 by the user, the terminal device displays the drawer screen in response to the operation of tapping the icon 1400 by the user. In this case, optionally, if there are a plurality of identical application icons on the home screen, the terminal device displays, in response to an operation of exiting the screen of the application by the user, a home screen ranking first among home screens on which the plurality of application icons are separately located.

Figure 15:
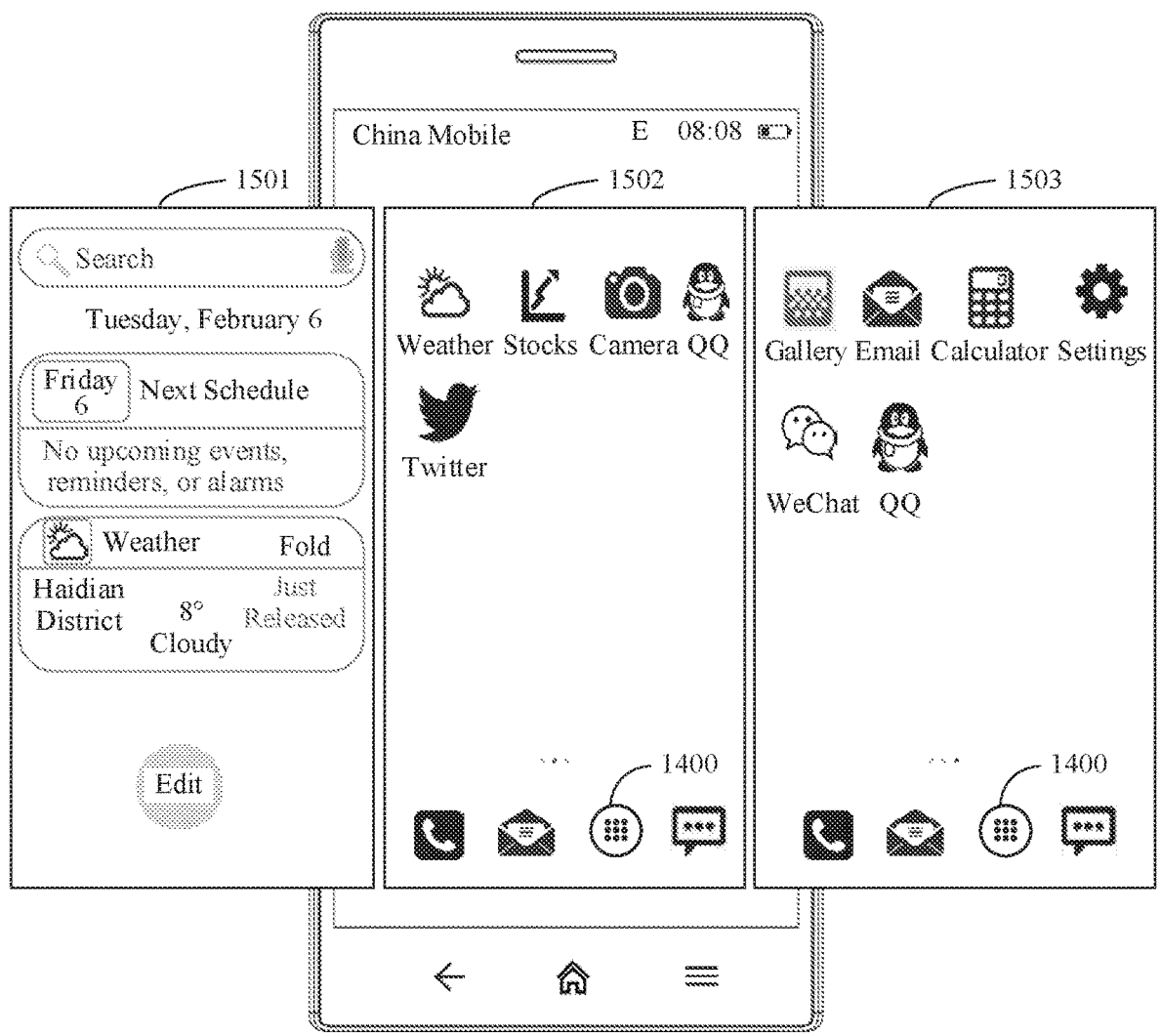
FIG. 15 is a schematic diagram in which each home screen used to display an application icon has a QQ icon according to an embodiment of this application.

For example, as shown in FIG. 15, the home screens of the terminal device include a HiBoard 1501, a first home screen 1502, and a second home screen 1503. The first home screen 1502 and the second home screen 1503 each include a QQ icon. The terminal device detects an input of the user for exiting a QQ screen, and in response to the input of the user for exiting the QQ screen, displays the first home screen 1502, and indicates a location of the QQ icon on the first home screen 1502. When location information of the QQ icon pre-stored in the cache, for example, the openList, is location information of the QQ icon on the second home screen 1503, the terminal device detects the input of the user for exiting the QQ screen, and in response to the input of the user for exiting the QQ screen, displays the second home screen 1503, and indicates a location of the QQ icon on the second home screen 1503.

Figure 16:
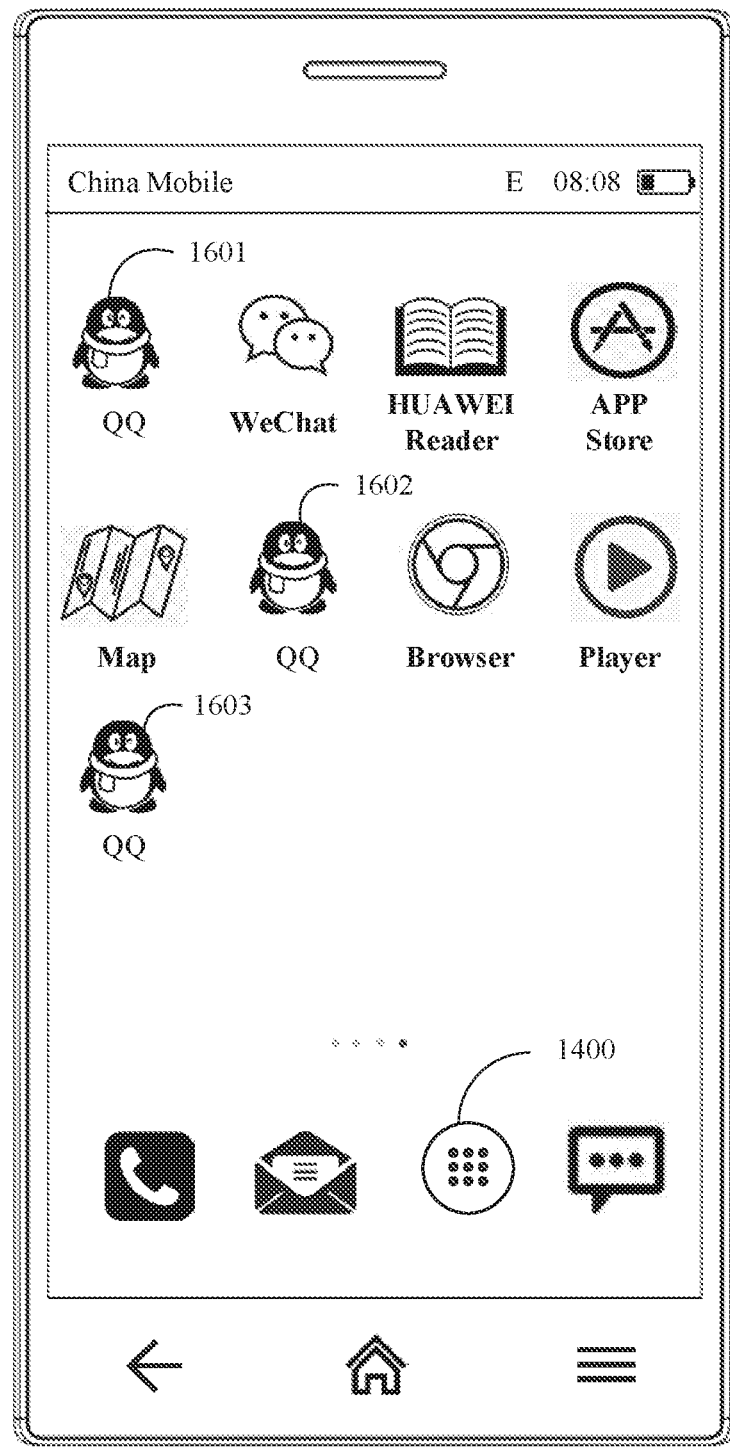
FIG. 16 is a schematic diagram in which a home screen displayed by a terminal device has a plurality of QQ icons according to an embodiment of this application.

For example, when one home screen includes a plurality of application icons, if the terminal device detects an input of the user for exiting a screen of an application, in response to the input of the user for exiting the screen of the application, the terminal device displays the home screen on which the application icons are located, and indicates a location of an application icon ranking first among the plurality of application icons on the home screen. For example, a screen shown in FIG. 16 includes a QQ icon 1601, a QQ icon 1602, and a QQ icon 1603. The terminal device detects an input of the user for exiting the QQ screen, and in response to the input of the user for exiting the QQ screen, displays the screen shown in FIG. 16, and indicates a location of the QQ icon 1601 among the QQ icon 1601, the QQ icon 1602, and the QQ icon 1603. On the screen shown in FIG. 16, the QQ icon 1601 is the uppermost icon among the QQ icon 1601, the QQ icon 1602, and the QQ icon 1603.

It should be further noted that, in a drawer desktop mode in which Alipay is used as an example, if there is no Alipay icon on the home screen, the terminal device detects an input of the user for exiting an Alipay screen, and displays a first home screen in response to the input of the user for exiting the Alipay screen. The first home screen may be an entry screen, or may be a home screen ranking first among the home screens. For example, as shown in FIG. 15, the home screens of the terminal device include the HiBoard 1501, the first home screen 1502, and the second home screen 1503. Neither the first screen 1502 nor the second home screen 1503 has an Alipay icon. If the terminal device detects the input of the user for exiting the Alipay screen, the terminal device displays the first home screen 1501 in response to the input of the user for exiting the Alipay screen. Alternatively, when the entry screen is the second home screen 1502, the display panel 2021 displays the second home screen 1502 in response to the input of the user for exiting the Alipay screen.

Figure 1D:
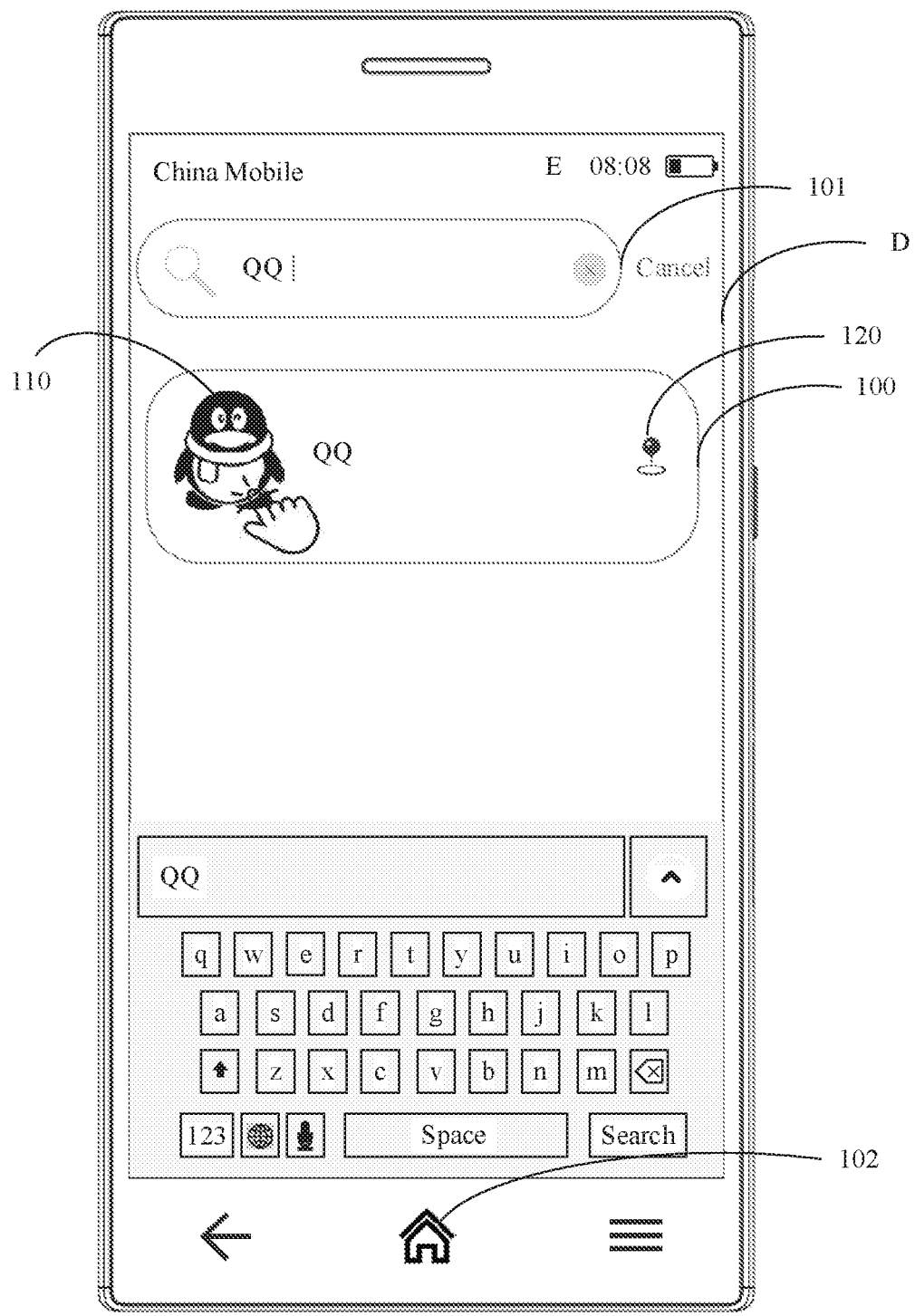
FIG. 1d is a schematic diagram of a search result screen displayed by a terminal device according to an embodiment of the present invention.
Figure 3:
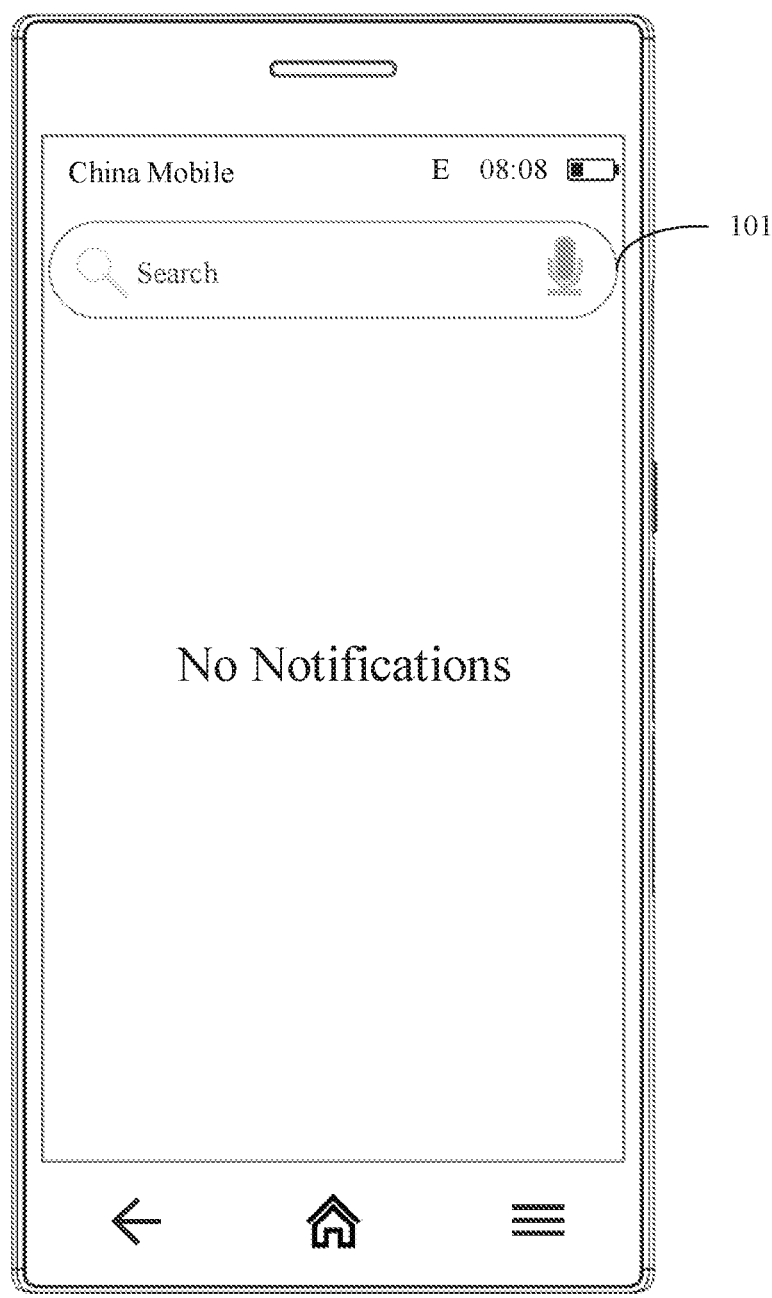
FIG. 3 is a schematic diagram of a notification screen displayed by a terminal device according to an embodiment of this application.

The following displays the screen shown in FIG. 3 after a mobile phone detects a pull-down operation of the user on the screen B shown in FIG. 1*b*. When detecting that QQ is entered in the search box on the screen shown in FIG. 3, the mobile phone outputs a search result 100 shown in FIG. 1*d*. When the mobile phone detects an operation that the user taps a QQ icon in the search result 100 on the screen D shown in FIG. 1*d*, a display panel of the mobile phone displays a QQ screen in response to the operation that the user taps the QQ icon in the search result 100. The QQ screen may be shown in FIG. 6.

Figure 17A:
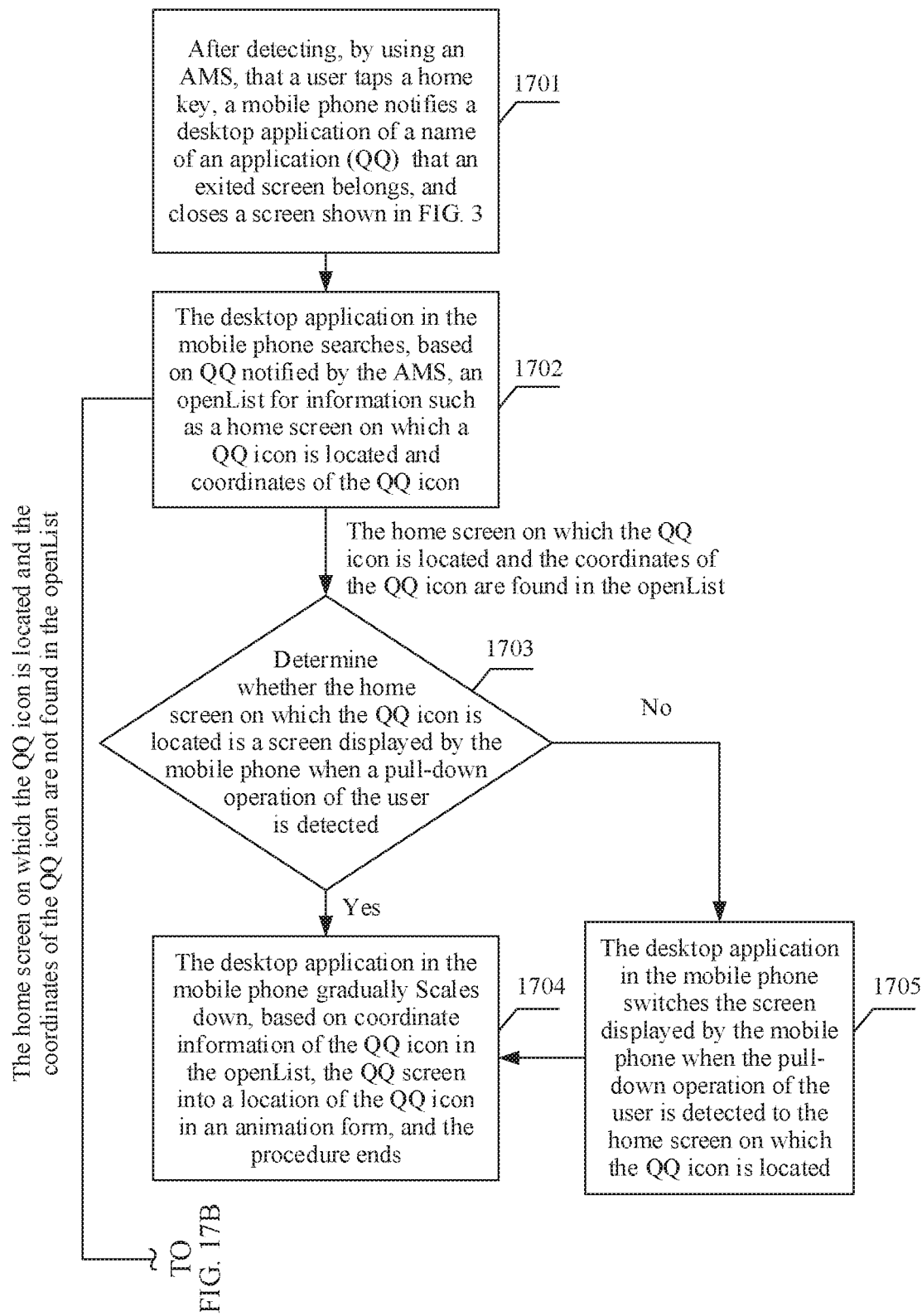
FIG. 17A and FIG. 17B are a schematic flowchart of a screen control method according to an embodiment of this application.
Figure 17B:
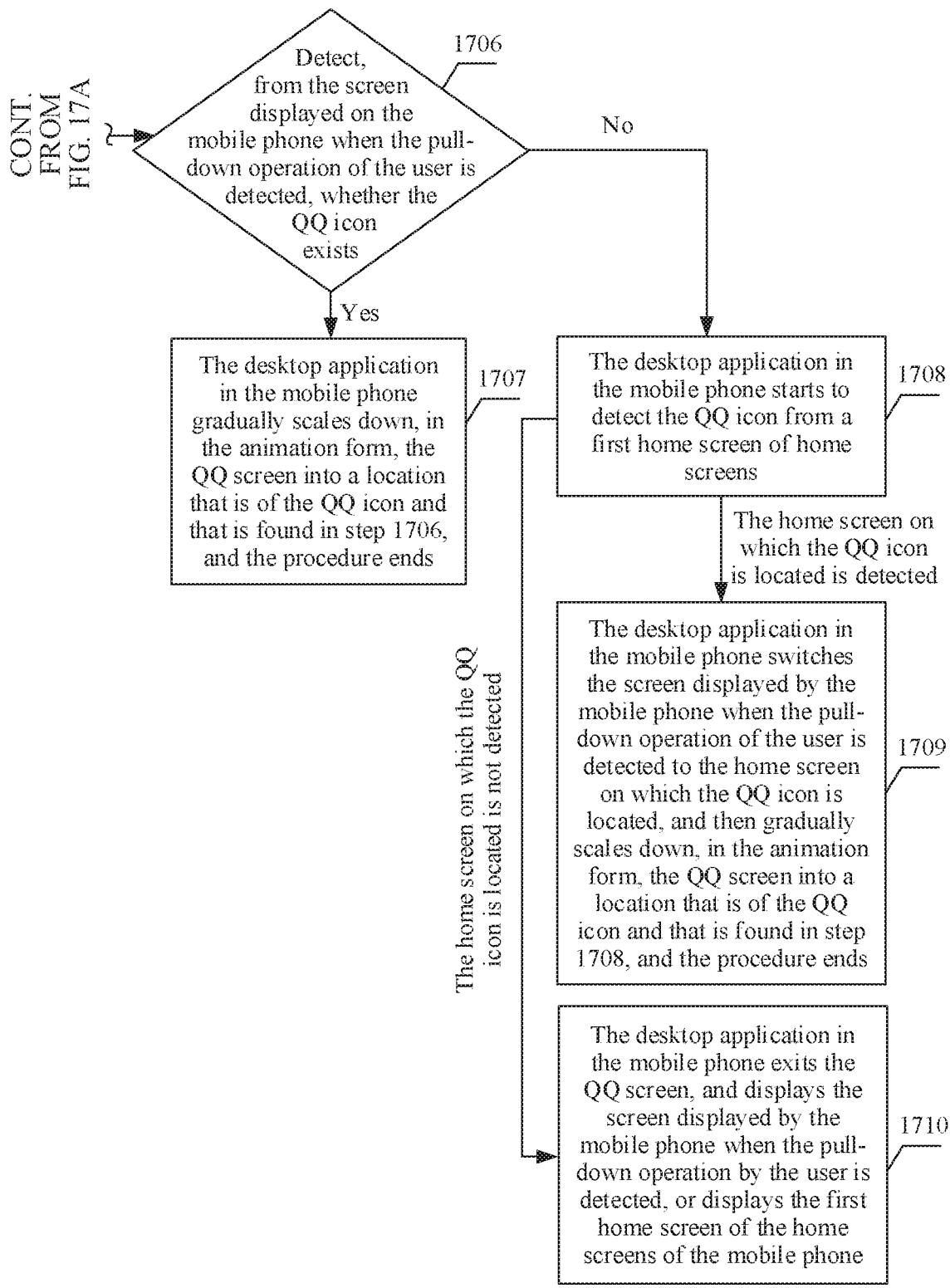

Based on the foregoing scenario, a control method in an embodiment of this application is described in detail. Specifically, as shown in FIG. 17A and FIG. 17B, the method includes the following steps.

Step 1701: After detecting, by using an application management system (application management system, AMS), that the user taps a home key, the mobile phone notifies a desktop application of a name of an application (QQ) that an exited screen belongs, and closes the screen shown in FIG. 3.

Step 1702: The desktop application in the mobile phone searches, based on QQ notified by the AMS, the openList for information such as a home screen on which a QQ icon is located and coordinates of the QQ icon.

Step 1703: If the desktop application in the mobile phone finds, in the openList, the information such as the home screen on which the QQ icon is located and the coordinates of the QQ icon, the desktop application determines whether the home screen on which the QQ icon is located is a screen (namely, the screen B shown in FIG. 1b) displayed by the mobile phone when the pull-down operation of the user is detected. If the QQ icon is on the screen B shown in FIG. 1b, step 1704 is performed; if the QQ icon is not on the screen B shown in FIG. 1b, step 1705 is performed.

Step 1704: The desktop application in the mobile phone gradually scales down, based on coordinate information of the QQ icon in the openList, the QQ screen into a location of the QQ icon in an animation form, and the procedure ends.

Step 1705: The desktop application in the mobile phone switches the screen (namely, the screen B shown in FIG. 1b) displayed by the mobile phone when the pull-down operation of the user is detected to the home screen on which the QQ icon is located, then step 1704 is performed, and the procedure ends.

Step 1706: If the desktop application in the mobile phone does not find, in the openList, the information such as the home screen on which the QQ icon is located and the coordinates of the QQ icon, the desktop application detects, from the screen (namely, the screen B shown in FIG. 1b) displayed by the mobile phone when the pull-down operation of the user is detected, whether the QQ icon exists, and if the QQ icon is detected on the screen B shown in FIG. 1b, step 1707 is performed; otherwise, step 1708 is performed.

Step 1707: The desktop application in the mobile phone gradually scales down, in the animation form, the QQ screen into a location that is of the QQ icon and that is found in step 1706, and the procedure ends.

Step 1708: The desktop application in the mobile phone starts to detect the QQ icon from a first home screen of the home screens; and if the home screen on which the QQ icon is located is detected, step 1709 is performed; otherwise, step 1710 is performed.

Step 1709: The desktop application in the mobile phone switches the screen displayed by the mobile phone when the pull-down operation of the user is detected to the home screen on which the QQ icon is located, and then gradually scales down, in the animation form, the QQ screen into a location that is of the QQ icon and that is found in step 1708; and the procedure ends.

Step 1710: The desktop application in the mobile phone exits the QQ screen, and displays the screen displayed by the mobile phone when the pull-down operation of the user is detected, or displays the first home screen of the home screens of the mobile phone.

Implementations of this application may be randomly combined to achieve different technical effects.

In the embodiments provided in this application, the methods provided in the embodiments of this application are described from a perspective in which the terminal device is used as an execution body. To implement functions in the methods provided in the embodiments of this application, the terminal device may include a hardware structure and/or a software module, and implement the functions in a form of the hardware structure, the software module, or a combination of the hardware structure and the software module. Whether a function of the foregoing functions is performed by using the hardware structure, the software module, or the combination of the hardware structure and the software module depends on a specific application and a design constraint condition of the technical solution.

Figure 18:
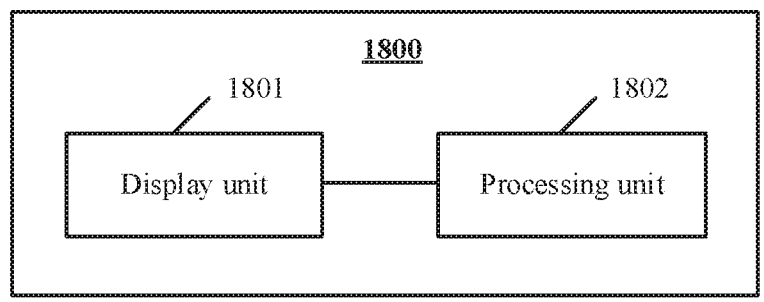
FIG. 18 is a schematic structural diagram of an electronic device according to an embodiment of the present application.

Based on a same concept, FIG. 18 shows an electronic device 1800 provided in this application. The electronic device 1800 may be a terminal device, or may be an apparatus that can support the terminal device in implementing a function of the terminal device in the method in FIG. 4.

Specifically, the electronic device 1800 includes a display unit 1801 and a processing unit 1802.

The display unit 1801 is configured to display a first home screen. The processing unit 1802 is configured to: when the display unit 1801 displays the first home screen, detect a preset first input, and in response to the first input, open a first application, and trigger the display unit 1801 to display a screen of the first application. The first input is an input of a user for opening the first application.

The processing unit 1802 is further configured to detect a preset second input, and trigger the display unit 1801 to display a second home screen in response to the second input. The second home screen is a home screen on which an icon of the first application is located. The second input is an input of the user for exiting the screen of the first application. The first home screen is different from the second home screen.

Optionally, when the display unit 1801 displays the first home screen, the processing unit 1802 is further configured to: if a preset third input is detected, in response to the third input, open a second application, and display a screen of the second application, where the third input is an input of the user for opening the second application; and if a preset fourth input is detected, trigger, in response to the fourth input, the display unit 1801 to display a third home screen. The third home screen is a home screen on which an icon of the second application is located. The fourth input is an input of the user for exiting the screen of the second application. The third home screen is different from the second home screen.

Optionally, the processing unit 1802 is further configured to: when the second input is detected, in response to the second input, display the second home screen, and indicate a location of the icon of the first application on the second home screen.

Optionally, the icon of the first application is located in a folder. The processing unit 1802 is configured to indicate a location of an icon of the folder on the second home screen.

Optionally, the processing unit 1802 is configured to: in response to the second input, trigger the display unit 1801 to display an animation in which the screen of the first application is gradually scaled down into the location of the icon of the first application on the second home screen, until the second home screen is displayed.

Optionally, the processing unit 1802 is further configured to: after detecting the second input, determine, from pre-stored application icon location information, location information corresponding to the icon of the first application, where the location information includes the home screen on which the icon of the first application is located; or after detecting the second input, sequentially search home screens from the first to the last for the home screen on which the icon of the first application is located.

Optionally, the first input includes: tapping, by the user, the icon of the first application in a search result; a voice instruction sent by the user for opening the first application; or tapping, by the user, a task window corresponding to the first application in at least one task window.

Optionally, the second input includes tapping a home key by the user, tapping a back key by the user, or a predefined gesture operation. The predefined gesture operation is used to exit the screen of the first application.

With descriptions of the foregoing embodiments, a person skilled in the art may clearly understand that the embodiments of this application may be implemented by hardware, firmware or a combination thereof. When the present invention is implemented by software, the foregoing functions may be stored in a computer-readable medium or transmitted as one or more instructions or code on the computer-readable medium. The computer-readable medium includes a computer storage medium and a communications medium. The communications medium includes any medium that enables a computer program to be transmitted from one place to another. The storage medium may be any available medium accessible to a computer. This is used as an example but is not limited to: The computer-readable medium may include a RAM, a ROM, an electrically erasable programmable read-only memory (electrically erasable programmable read-only memory, EEPROM), a compact disc read-only memory (compact disc read-only memory, CD-ROM) or another compact disc storage, a magnetic disk storage medium or another magnetic storage device, or any other medium that can be configured to carry or store desired program code in a form of an instruction or a data structure and that can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (digital subscriber line. DSL) or wireless technologies such as infrared ray, radio and microwave, the coaxial cable, optical fiber/cable, twisted pair, DSL or wireless technologies such as infrared ray, radio and microwave are included in fixation of a medium to which they belong. A disk (disk) and disc (disc) used by the embodiments of this application includes a compact disc (compact disc, CD), a laser disc, an optical disc, a digital video disc (digital video disc, DVD), a floppy disk and a Blu-ray disc. The disk generally copies data magnetically, or optically copies the data by using a laser. The foregoing combination should also be included in the protection scope of the computer-readable medium.

In summary, what is described above is merely embodiments of this application, but is not intended to limit the protection scope of this application. Any modification, equivalent replacement, or improvement made according to the disclosure of this application shall fall within the protection scope of this application.

What is claimed is:

1. A control method implemented by a terminal device, wherein the control method comprises:
rendering a plurality of home screens by the terminal device including a first home screen and a second home screen, wherein the second home screen comprises a first icon of a first application;
displaying the first home screen including a search box;
receiving a first user input in the search box of the first home screen for searching the first application;
in response to receiving the first user input, displaying a result of the searching, wherein the result comprises a second icon of the first application in the first home screen;
in response to selecting the second icon of the first application in the first home screen, opening the first application and displaying a first application interface of the first application in the first home screen; and
when the first application is opened by selecting the second icon in the first home screen, switching from the first application interface of the first home screen to a second application interface of the first application in the second home screen in response to detecting a preset second user input for exiting the first application interface from the first home screen,
wherein the second home screen existed before opening the first application and is different from the first home screen.

2. The control method of claim 1, further comprising indicating a first location of the first icon on the second home screen.

3. The control method of claim 2, wherein the first icon is located in a folder, and wherein the control method further comprises indicating a second location of a third icon of the folder on the second home screen.

4. The control method of claim 2 further comprising displaying, in response to the preset second user input, an animation in which the first application interface is gradually scaled down into the first location on the second home screen until the second home screen is displayed.

5. The control method of claim 1, wherein after detecting the preset second user input, the control method further comprises:
determining, from prestored application icon location information, location information corresponding to the first icon, wherein the location information comprises the second home screen; or
sequentially searching home screens from the first home screen to a last home screen for the second home screen.

6. The control method of claim 1, further comprising:
displaying a third home screen;
receiving a voice instruction of a user for searching a second application;
opening the second application and displaying a second application interface of the second application in response to the voice instruction; and
switching from the second application interface to a fourth home screen when detecting a preset third user input for exiting the second application interface,
wherein the fourth home screen comprises a third icon of the second application, and
wherein the fourth home screen is different from the third home screen.

7. The control method of claim 1, wherein the preset second user input comprises:
tapping a home key;
tapping a back key; or
a predefined gesture operation for exiting the first application interface.

8. The control method of claim 1, wherein the first user input comprises a name of the first application.

9. The control method of claim 1, wherein the result further comprises a locating identifier.

10. An electronic device comprising:
a memory configured to store one or more computer programs; and
a processor coupled to the memory, wherein the one or more computer programs cause the processor be configured to:
render a plurality of home screens by the electronic device including a first home screen and a second home screen, wherein the second home screen comprises a first icon of a first application;
display the first home screen including a search box;
receive a first user input in the search box of the first home screen for searching the first application;

in response to receiving the first user input, display a result of the searching, wherein the result comprises a second icon of the first application in the first home screen;

in response to selecting the second icon of the first application in the first home screen, open the first application and display a first application interface of the first application in the first home screen;

detect a preset second input for exiting the screen of the first application from the first home screen; and when the first application is opened by selecting the second icon in the first home screen, switching from the first application interface of the first home screen to a second application interface of the first application in the second home screen in response to detecting the preset second input for exiting the first application interface from the first home screen, wherein the second home screen existed before opening the first application and is different from the first home screen.

11. The electronic device of claim 10, wherein the one or more computer programs further cause the processor to be configured to indicate a first location of the first icon on the second home screen.

12. The electronic device of claim 11, wherein the first icon is located in a folder, and wherein the one or more computer programs further cause the processor to be configured to indicate a second location of a third icon of the folder on the second home screen.

13. The electronic device of claim 11, wherein the one or more computer programs further cause the processor to be configured to display an animation in which the first application interface is gradually scaled down into the first location on the second home screen until the second home screen is displayed.

14. The electronic device of claim 10, wherein after detecting the preset second input and before displaying the second home screen, the one or more computer programs further cause the processor to be configured to determine, from prestored application icon location information, location information corresponding to the first icon, and wherein the location information comprises the second home screen.

15. The electronic device of claim 10, wherein after detecting the preset second input and before displaying the second home screen, the one or more computer programs further cause the processor to be configured to sequentially search home screens from the first home screen to a last home screen for the second home screen.

16. The electronic device of claim 10, wherein the one or more computer programs further cause the processor to be configured to:

display a third home screen;

receive a voice instruction of a user for searching a second application;

open the second application and switch to a second application interface of the second application in response to the voice instruction; and switch from the second application interface to a fourth home screen when detecting a preset third user input for exiting the second application interface, wherein the fourth home screen comprises a fourth icon of the second application, and wherein the fourth home screen is different from the third home screen.

17. The electronic device of claim 10, wherein the preset second input comprises:

tapping a home key;

tapping a back key; or a predefined gesture operation for exiting the first application interface.

18. The electronic device of claim 10, wherein the first user input comprises a name of the first application.

19. A computer program product comprising computer-executable instructions for storage on a non-transitory computer-readable storage medium that, when executed by a processor, cause an apparatus to:

render a plurality of home screens by the apparatus including a first home screen and a second home screen, wherein the second home screen comprises a first icon of a first application;

display the first home screen including a search box;

receive a first user input in the search box of the first home screen for searching the first application;

in response to receiving the first user input, display a result of the searching, wherein the result comprises a second icon of the first application in the first home screen;

in response to selecting the second icon of the first application in the first home screen, open the first application and display a first application interface of the first application in the first home screen;

detect a preset second input for exiting the first application interface; and when the first application is opened by selecting the second icon in the first home screen, switching from the first application interface of the first home screen to a second application interface of the first application in the second home screen in response to detecting the preset second input for exiting the first application interface from the first home screen, wherein the second home screen existed before opening the first application and is different from the second home screen.

20. The computer program product of claim 19, wherein the first user input comprises a name of the first application.

* * * * *